US012579660B2

(12) United States Patent
Itsumi et al.

(10) Patent No.: US 12,579,660 B2
(45) Date of Patent: Mar. 17, 2026

(54) VIDEO ANALYSIS APPARATUS, VIDEO ANALYSIS SYSTEM, AND VIDEO ANALYSIS METHOD

(71) Applicant: NEC Corporation, Tokyo (JP)

(72) Inventors: Hayato Itsumi, Tokyo (JP); Takanori Iwai, Tokyo (JP); Yusuke Shinohara, Tokyo (JP); Florian Beye, Tokyo (JP)

(73) Assignee: NEC CORPORATION, Tokyo (JP)

( * ) Notice: Subject to any disclaimer, the term of this patent is extended or adjusted under 35 U.S.C. 154(b) by 498 days.

(21) Appl. No.: 17/917,616

(22) PCT Filed: Feb. 19, 2021

(86) PCT No.: PCT/JP2021/006512
§ 371 (c)(1),
(2) Date: Oct. 7, 2022

(87) PCT Pub. No.: WO2021/210269
PCT Pub. Date: Oct. 21, 2021

(65) Prior Publication Data
US 2023/0177701 A1 Jun. 8, 2023

(30) Foreign Application Priority Data
Apr. 13, 2020 (JP) ................................. 2020-071448

(51) Int. Cl.
*G06K 9/00* (2022.01)
*G06T 7/215* (2017.01)
(Continued)

(52) U.S. Cl.
CPC ..... *G06T 7/215* (2017.01); *H04N 21/234381* (2013.01); *H04N 21/44008* (2013.01); *G06T 2210/12* (2013.01)

(58) Field of Classification Search
CPC ....... G06T 7/215; G06T 2210/12; G06T 1/20; H04N 21/234381; H04N 21/44008; H04N 7/18; G06V 20/56
See application file for complete search history.

(56) References Cited

U.S. PATENT DOCUMENTS

2020/0082561 A1 * 3/2020 Karonchyk ............... G06T 7/74

FOREIGN PATENT DOCUMENTS

EP          3506228 A1 *  7/2019  ......... G06K 9/00771
JP       2010-136032 A    6/2010
(Continued)

OTHER PUBLICATIONS

International Search Report for PCT Application No. PCT/JP2021/006512, mailed on Apr. 13, 2021.
(Continued)

*Primary Examiner* — Xin Jia
(74) *Attorney, Agent, or Firm* — Sughrue Mion, PLLC

(57) ABSTRACT

A video analysis apparatus and the like with improved video analysis accuracy are provided.
The video analysis apparatus includes a first video analysis unit and a second video analysis unit. The first video analysis unit is configured to distribute frames to the first video analysis unit or the second video analysis unit, detect a target object in frames which are distributed to be analyzed in the first video analysis unit, and acquire information on movement associated with the detected target object, and transmitting the information on the movement and a detection result in the first detection unit to the second video analysis unit. The second video analysis unit is configured to detect a target object in frames from the distribution unit, and adjust the detection result of the first detection unit based on a detection result in the second detection unit and the information on the movement.

20 Claims, 17 Drawing Sheets

(51) Int. Cl.
  *H04N 21/2343*      (2011.01)
  *H04N 21/44*        (2011.01)

(56)               References Cited

FOREIGN PATENT DOCUMENTS

| WO | 2018/012064 A1 | 1/2018 | |
|---|---|---|---|
| WO | WO-2019074601 A1 * | 4/2019 | ......... G06K 9/00295 |

OTHER PUBLICATIONS

Sandeep Chinchali et al., "Network Offloading Policies for Cloud Robotics: a Learning-based Approach",arXif:1902.05703v1 [cs. RO]. Feb. 15, 2019.

* cited by examiner

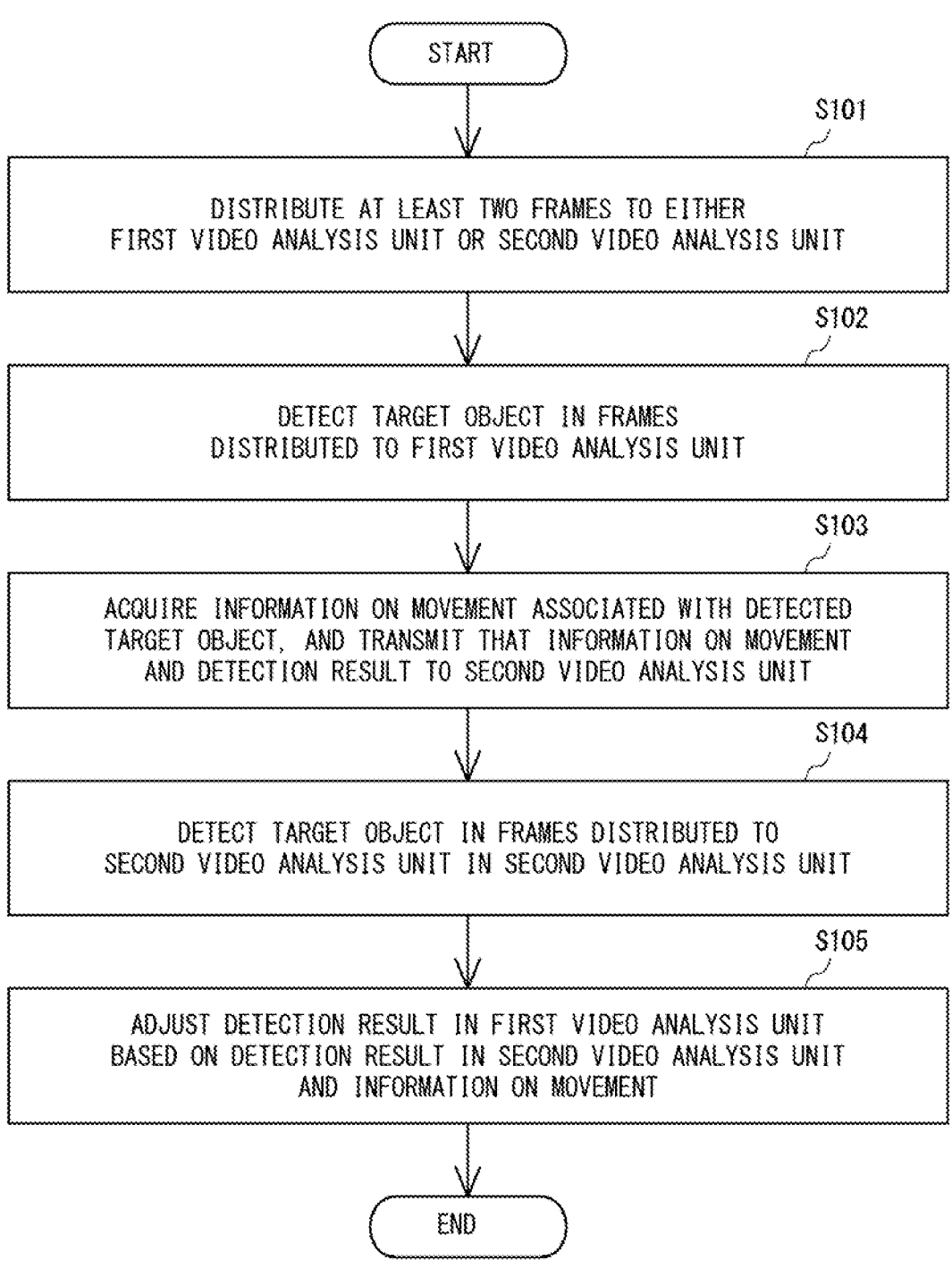

START

S101

DISTRIBUTE AT LEAST TWO FRAMES TO EITHER
FIRST VIDEO ANALYSIS UNIT OR SECOND VIDEO ANALYSIS UNIT

S102

DETECT TARGET OBJECT IN FRAMES
DISTRIBUTED TO FIRST VIDEO ANALYSIS UNIT

S103

ACQUIRE INFORMATION ON MOVEMENT ASSOCIATED WITH DETECTED
TARGET OBJECT, AND TRANSMIT THAT INFORMATION ON MOVEMENT
AND DETECTION RESULT TO SECOND VIDEO ANALYSIS UNIT

S104

DETECT TARGET OBJECT IN FRAMES DISTRIBUTED TO
SECOND VIDEO ANALYSIS UNIT IN SECOND VIDEO ANALYSIS UNIT

S105

ADJUST DETECTION RESULT IN FIRST VIDEO ANALYSIS UNIT
BASED ON DETECTION RESULT IN SECOND VIDEO ANALYSIS UNIT
AND INFORMATION ON MOVEMENT

END

Fig. 2

(b) CAR SHIFTED BASED ON MOVEMENT VECTOR (a) CAR IN FRAME AT TIME t

Fig. 13

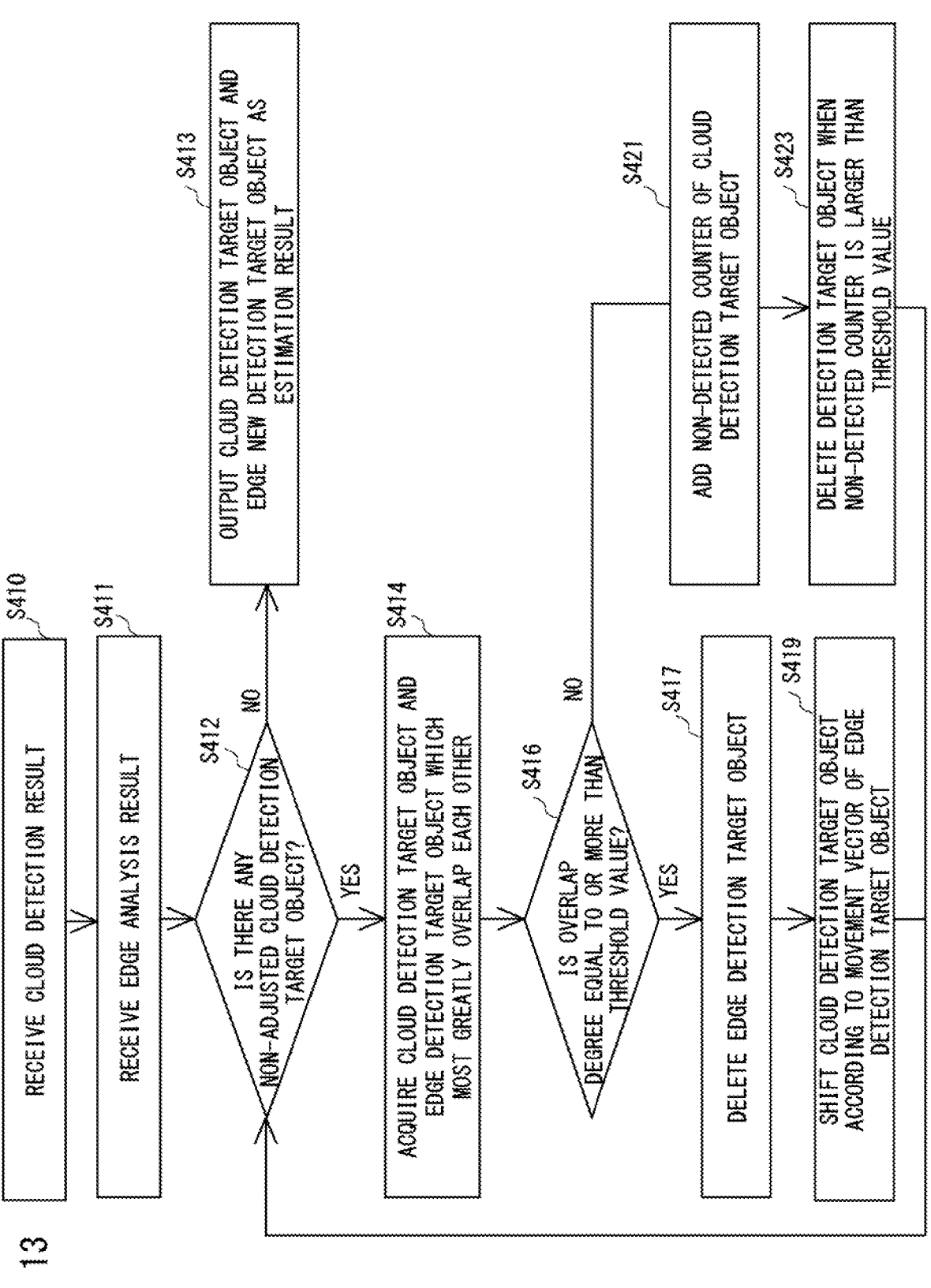

S410 RECEIVE CLOUD DETECTION RESULT

S411 RECEIVE EDGE ANALYSIS RESULT

S412 IS THERE ANY NON-ADJUSTED CLOUD DETECTION TARGET OBJECT?

NO — S413 OUTPUT CLOUD DETECTION TARGET OBJECT AND EDGE NEW DETECTION TARGET OBJECT AS ESTIMATION RESULT

YES

S414 ACQUIRE CLOUD DETECTION TARGET OBJECT AND EDGE DETECTION TARGET OBJECT WHICH MOST GREATLY OVERLAP EACH OTHER

S416 IS OVERLAP DEGREE EQUAL TO OR MORE THAN THRESHOLD VALUE?

NO — S421 ADD NON-DETECTED COUNTER OF CLOUD DETECTION TARGET OBJECT

S423 DELETE DETECTION TARGET OBJECT WHEN NON-DETECTED COUNTER IS LARGER THAN THRESHOLD VALUE

YES — S417 DELETE EDGE DETECTION TARGET OBJECT

S419 SHIFT CLOUD DETECTION TARGET OBJECT ACCORDING TO MOVEMENT VECTOR OF EDGE DETECTION TARGET OBJECT 100, 200

VIDEO ANALYSIS APPARATUS, VIDEO ANALYSIS SYSTEM, AND VIDEO ANALYSIS METHOD

This application is a National Stage Entry of PCT/JP2021/006512 filed on Feb. 19, 2021, which claims priority from Japanese Patent Application 2020-071448 filed on Apr. 13, 2020, the contents of all of which are incorporated herein by reference, in their entirety.

TECHNICAL FIELD

The present invention relates to a video analysis apparatus, a video analysis system, and a video analysis method.

BACKGROUND ART

Non Patent Literature 1 discloses a technique of distributing a series of video frames and performing video analysis by a plurality of video analysis units.

CITATION LIST

Non Patent Literature

Non Patent Literature 1 Sandeep Chinchali, "Network Offloading Policies for Cloud Robotics: a Learning-based Approach"

SUMMARY OF INVENTION

Technical Problem

However, the technique described in Non Patent Literature 1 still has a problem that the accuracy of video analysis is not sufficient.

The present invention has been made to solve such a problem, and has an object to provide a video analysis apparatus, a video analysis system, and a video analysis method with improved video analysis accuracy.

Solution to Problem

A video analysis apparatus according to a first aspect of the present invention is a video analysis apparatus including a first video analysis unit and a second video analysis unit, in which the first video analysis unit includes:

a distribution unit for distributing at least two frames to the first video analysis unit or the second video analysis unit;

a first detection unit for detecting a target object in the frames distributed to the first video analysis unit; and an acquisition unit for acquiring information on movement associated with the detected target object, and transmitting the information on the movement and a detection result in the first detection unit to the second video analysis unit, and the second video analysis unit includes:

a second detection unit for detecting a target object in the frames received from the distribution unit; and an adjustment unit for adjusting the detection result in the first detection unit based on a detection result in the second detection unit and the information on the movement.

A video analysis system according to a second aspect of the present invention is a video analysis system including a first video analysis unit and a second video analysis unit, in which the first video analysis unit includes:

a distribution unit for distributing at least two frames to the first video analysis unit or the second video analysis unit;

a first detection unit for detecting a target object in the frames distributed to the first video analysis unit; and an acquisition unit for acquiring information on movement associated with the detected target object, and transmitting the information on the movement and a detection result in the first detection unit to the second video analysis unit, and the second video analysis unit includes:

a second detection unit for detecting a target object in the frames received from the distribution unit; and an adjustment unit for adjusting the detection result in the first detection unit based on a detection result in the second detection unit and the information on the movement.

A video analysis method according to a third aspect of the present invention is a video analysis method in which a series of frames are subjected to video analysis while distributed into a first video analysis unit and a second video analysis unit, including:

in the first video analysis unit, sequentially receiving at least two frames and distributing the frames according to which one of the first video analysis unit and the second video analysis unit analyzes the frames;

detecting a target object in a frame which has been distributed to be analyzed in the first video analysis unit;

acquiring information on movement associated with the detected target object, and transmitting the information on the movement and a detection result in the first video analysis unit to the second video analysis unit, and in the second video analysis unit, detecting a target object in a frame received from the first video analysis unit; and adjusting a detection result in the first video analysis unit based on a detection result in the second video analysis unit and the information on the movement.

Advantageous Effects of Invention

According to the present invention, it is possible to provide a video analysis apparatus, a video analysis system, and a video analysis method with improved video analysis accuracy.

BRIEF DESCRIPTION OF DRAWINGS

FIG. 2 is a flowchart showing a video analysis method according to the first example embodiment;

FIG. 13 is a flowchart showing an operation by an analysis result adjusting unit arranged on the cloud side according to the third example embodiment;

EXAMPLE EMBODIMENT

First Example Embodiment 1

Example embodiments of the present invention will be described with reference to the drawings.

Figure 1:
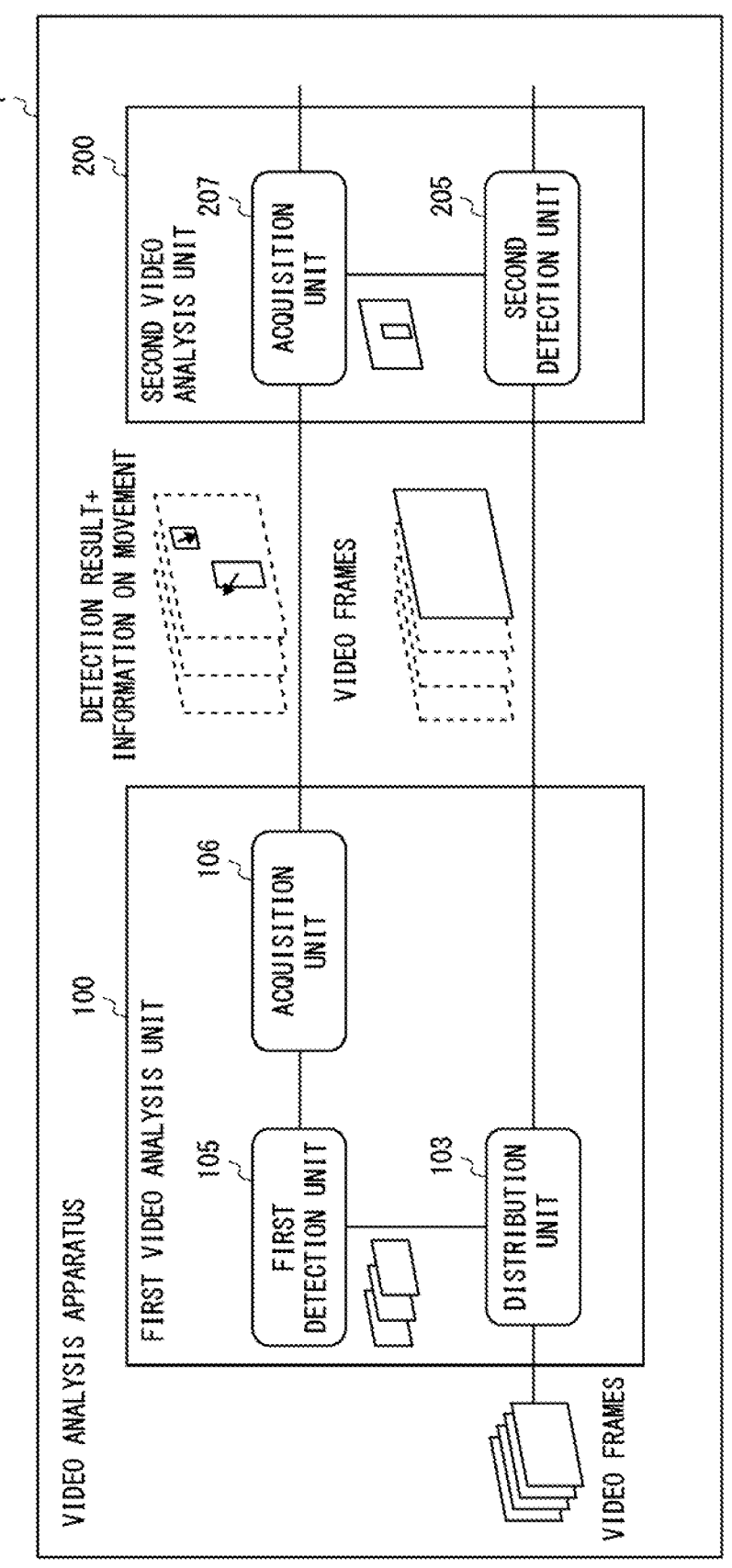
FIG. 1 is a block diagram showing a configuration of a video analysis apparatus according to a first example embodiment.

FIG. 1 is a block diagram showing a configuration of a video analysis apparatus according to a first example embodiment.

A video analysis apparatus 1 includes a first video analysis unit 100 and a second video analysis unit 200 in order to distribute and process at least two frames. The video analysis apparatus 1 may be implemented by one or more computers. The at least two frames may be two sequential frames or two frames between which another frame is interposed.

The first video analysis unit 100 includes a distribution unit 103 for distributing at least two frames to the first video analysis unit 100 or the second video analysis unit 200, a first detection unit 105 for detecting target objects in the frames distributed to be analyzed in the first video analysis unit 100, and an acquisition unit 106 for acquiring information on movement associated with the detected target objects, and transmitting the information on the movement and the detection result of the first detection unit 105 to the second video analysis unit 200. The first detection unit 105 uses a predetermined video analysis program to detect a pre-designated target object from the frames. The distribution unit 103 can distribute the frames to the first video analysis unit 100 or the second video analysis unit 200 at a predetermined distribution rate. "Information on movement associated with a detected target object" may include, for example, information on the moving direction or motion vector of the target object within the bounding box surrounding the target object.

The second video analysis unit 200 includes a second detection unit 205 for detecting target objects in frames from the distribution unit 103, and an adjustment unit 207 for adjusting the detection result in the first detection unit 105 based on the detection result in the second detection unit 205 and the information on the movement. The second detection unit 205 uses a predetermined video analysis program to detect a pre-designated target object from the frames.

FIG. 2 is a flowchart showing a video analysis method according to the first example embodiment.

The video analysis method according to the first example embodiment distributes and processes at least two frames in the first video analysis unit 100 and the second video analysis unit 200.

In the first video analysis unit 100, at least two sequentially-received frames are distributed to the first video analysis unit 100 or the second video analysis unit 200 (step S101). Target objects in the frames distributed to the first video analysis unit 100 are detected (step S102). Information on movement associated with the detected target objects is acquired, and the information on the movement and the detection result in the first video analysis unit 100 are transmitted to the second video analysis unit 200 (step S103). In the second video analysis unit 200, target objects in the frames received from the first video analysis unit 100 are detected (step S103). In the second video analysis unit 200, the detection result in the first video analysis unit 100 is adjusted based on the detection result in the second video analysis unit 200 and the information on the movement (step S105).

According to the video analysis apparatus and the video analysis method of the first example embodiment described above, highly accurate video analysis results can be acquired even if at least two frames are distributed and processed in a plurality of video analysis units.

Second Example Embodiment

Figure 3:
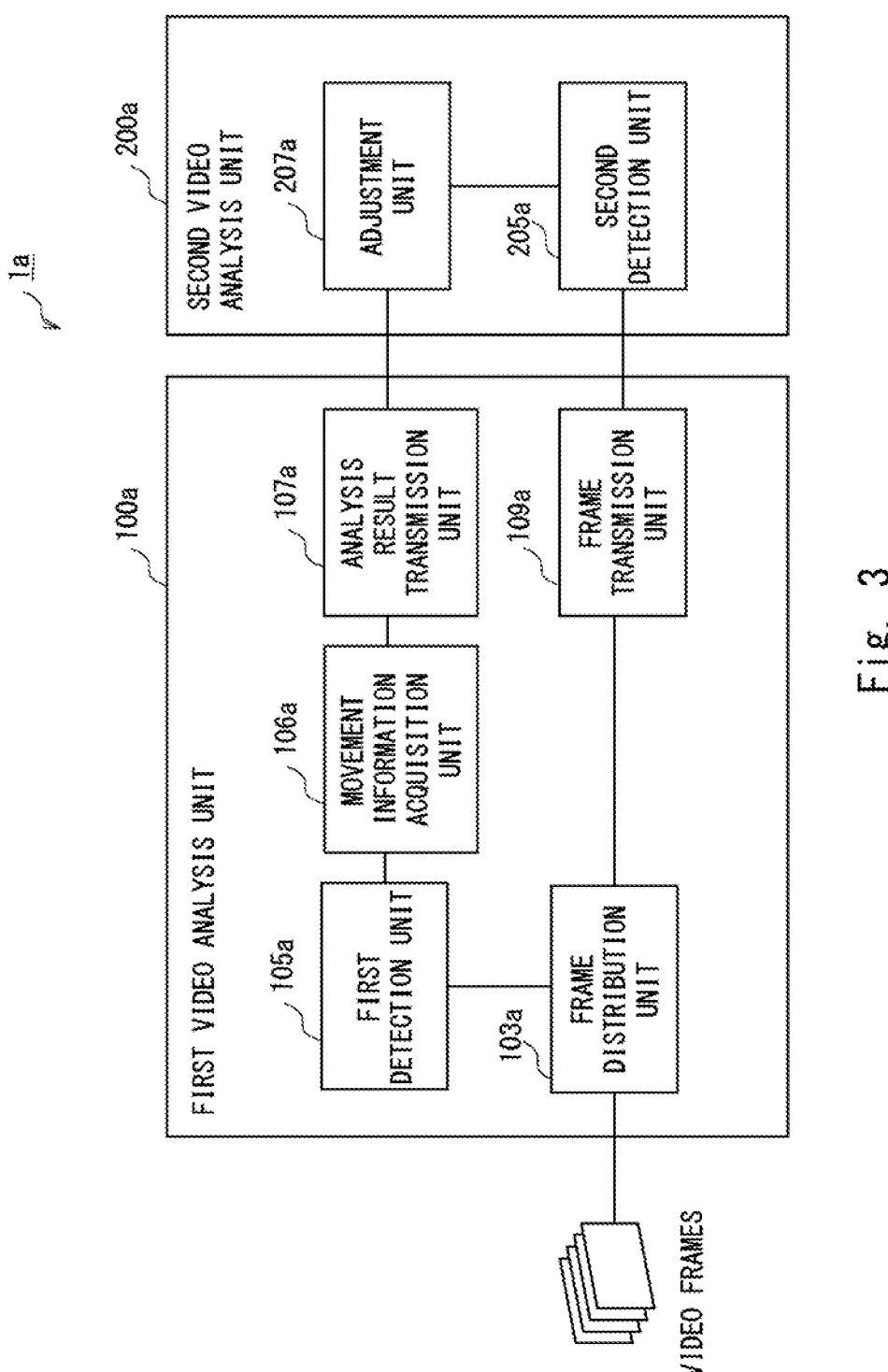
FIG. 3 is a block diagram showing a configuration of a video analysis apparatus according to a second example embodiment.

FIG. 3 is a block diagram showing a configuration of a video analysis apparatus according to a second example embodiment.

A video analysis apparatus 1a includes a first video analysis unit 100a and a second video analysis unit 200a in order to distribute and process a series of frames (including at least two frames).

The first video analysis unit 100a includes a distribution unit 103a for distributing at least two series of frames received from a camera to the first video analysis unit 100a or the second video analysis unit 200a, a first detection unit 105a for detecting target objects in frames distributed to the first video analysis unit 100, a movement information acquisition unit 106a for acquiring information on movement within the detected target objects, an analysis result transmission unit 107a for transmitting the information on the movement and the detection result in the first detection unit 105a to the second video analysis unit, and a frame transmission unit 109a for transmitting frames distributed to the second video analysis unit 200a to the second video analysis unit 200a.

The first detection unit 105a uses a predetermined video analysis program to detect a pre-designated target object from the frames. The detected target object may be surrounded by a bounding box. The movement information acquisition unit 106a recognizes that the target object moves between two frames, and acquires movement information related to the target object within the bounding box. The movement information acquisition unit 106a can acquire the movement information by comparing video frames temporarily stored in a storage unit inside the first video analysis unit 100*a* with detection result frames from the first detection unit 105*a*. The movement information to be acquired may include information on the moving direction or motion vector of the target object. The distribution unit 103 can distribute frames to the first video analysis unit 100 or the second video analysis unit 200 at a predetermined distribution rate. For example, when the distribution rate is set to 10%, the distribution unit 103 count frames to be sequentially received by using a distribution counter, whereby it may transmit a first frame to the second video analysis unit 200, and then transmit the remaining nine frames to the first video analysis unit 100. The distribution rate is set to be equal to or higher than a threshold value.

"Information on movement of the detected target object within a detection area" may include, for example, information on the moving direction or motion vector of the target object within the bounding box surrounding the target object.

The frame transmission unit 109*a* may include an encoder for encoding video frames with a predetermined quality. The first video analysis unit 100*a* according to the present example embodiment includes an analysis result transmission unit 107*a* and a frame transmission unit 109*a*. The analysis result transmission unit 107*a* transmits the motion vectors for the frames distributed to the first video analysis unit 100*a* and the detection result as an analysis result to the second video analysis unit 200*a*. Therefore, the transmission data capacity per frame of the analysis result transmission unit 107*a* is relatively small. On the other hand, since the frame transmission unit 109*a* encodes the frames distributed to the second video analysis unit 200*a* with a predetermined quality and then transmits them, the transmission data capacity per frame of the frame transmission unit 109*a* is larger than that of the analysis result transmission unit 107*a*. As described above, the analysis result transmission unit 107*a* and the frame transmission unit 109*a* deal with different frames, that is, frames distributed to the first video analysis unit 100*a* and frames distributed to the second video analysis unit 200*a* by the distribution unit 103*a*, respectively.

The second video analysis unit 200*a* includes a second detection unit 205*a* for detecting target objects in frames received from the frame transmission unit 109*a*, and an adjustment unit 207*a* for adjusting the detection result in the first detection unit 105*a* based on the detection result in the second detection unit 205*a* and the information on the movement. The second detection unit 205*a* detects a predesignated target object from the frames by using a predetermined video analysis program different from the predetermined video analysis program of the first detection unit 105*a*, or a predetermined video analysis program having higher accuracy.

Figure 4:
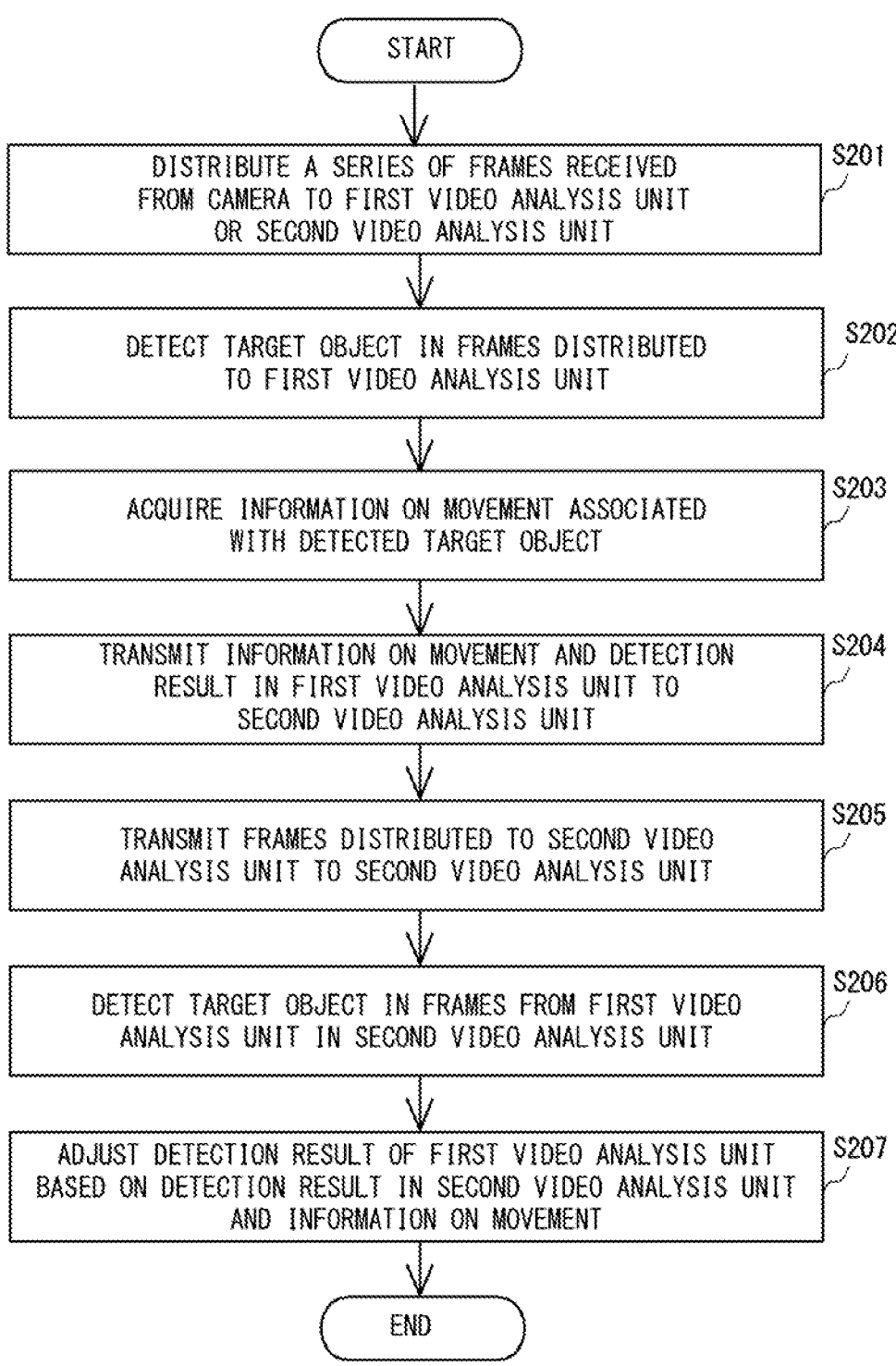
FIG. 4 is a flowchart showing a video analysis method according to the second example embodiment.

FIG. 4 is a flowchart showing a video analysis method according to the second example embodiment.

The video analysis method according to the second example embodiment distributes and processes at least two frames in the first video analysis unit 100 and the second video analysis unit 200.

The first video analysis unit 100*a* separately distributes a series of frames received from a camera to the first video analysis unit 100*a* or the second video analysis unit 200*a* (step S201). The first video analysis unit 100*a* detects target objects in frames distributed to the first video analysis unit 100*a* (step S202). The first video analysis unit 100*a* acquires information on movement of a detected target object within a detection area (for example, a bounding box) (step S203). The first video analysis unit 100*a* transmits the information on the movement and the detection result in the first video analysis unit 100*a* to the second video analysis unit 200*a* (step S204). The first video analysis unit 100*a* transmits the frames distributed to the second video analysis unit 200*a* to the second video analysis unit 200*a* (step S205).

The second video analysis unit 200*a* detects target objects in frames received from the first video analysis unit 100*a* (step S206). The detection result in the first video analysis unit 100*a* is adjusted based on the detection result in the second video analysis unit 200*a* and the information on the movement received from the first video analysis unit 100*a* (step S207).

According to the video analysis apparatus and the video analysis method of the second example embodiment described above, highly accurate video analysis results can be obtained even if a series of frames are distributed and processed in a plurality of video analysis units.

Third Example Embodiment

Figure 5:
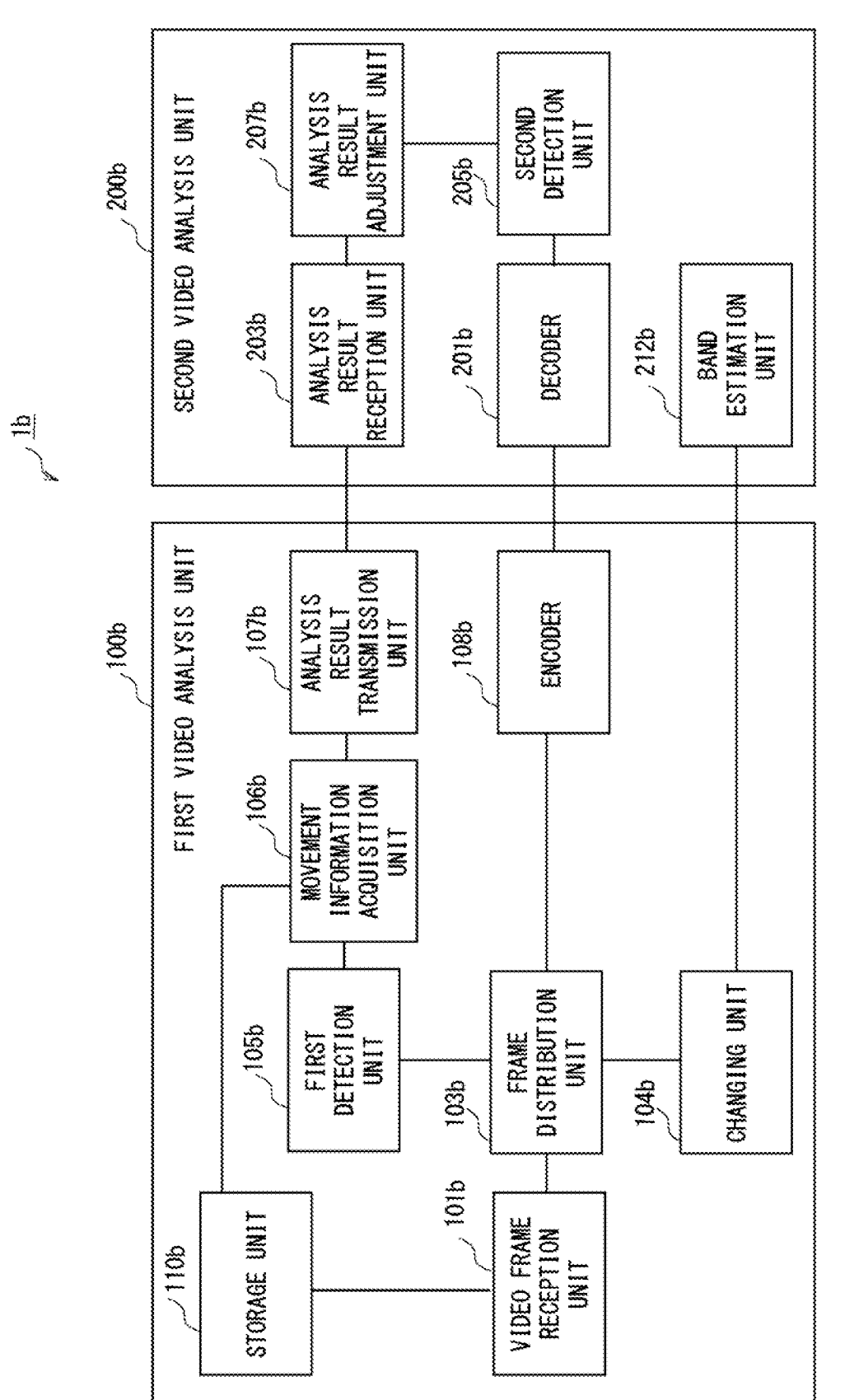
FIG. 5 is a block diagram showing a structure of a video analysis system according to a third example embodiment.

FIG. 5 is a block diagram showing a structure of a video analysis system according to a third example embodiment.

A video analysis system 1*b* includes a first video analysis unit 100*b* and a second video analysis unit 200*b*. The first video analysis unit 100*b* is arranged on an edge side and connected to a camera in a wired or wireless manner. When the first video analysis unit 100*b* and the camera are connected to each other, for example, through wireless communication such as Wi-Fi (registered trademark), the number of connected devices is small, so that stable communication can be performed as compared with a mobile phone network such as 4G or 5G. The first video analysis unit 100*b* often fails to prepare sufficient calculation resources due to restrictions on the power supply and installation space, resulting in a low-accuracy model with low calculation cost. On the other hand, the second video analysis unit 200 is connected to the first video analysis unit 100 via a wireless network such as LTE (registered trademark), 5G or Wi-fi (registered trademark), and implements highly accurate video analysis because it has abundant calculation resources as compared with the first video analysis unit 100*b*.

Figure 17:
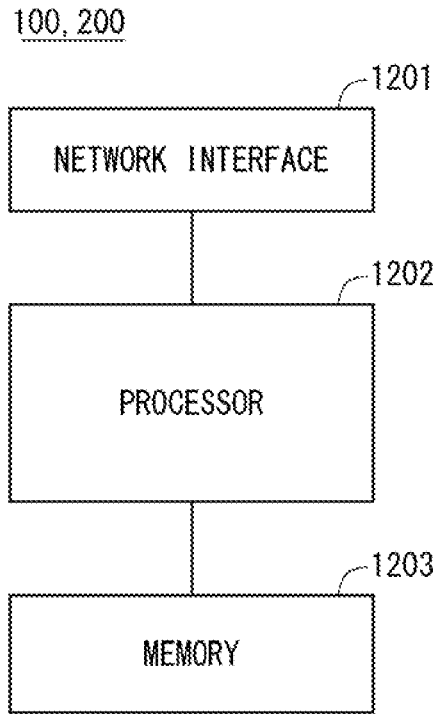
FIG. 17 is a block diagram showing a hardware configuration example of a video analysis apparatus or a video analysis unit.

First, the configuration of the first video analysis unit 100*b* will be described. The first video analysis unit 100*b* is, for example, an in-vehicle mounted video analysis apparatus that can be implemented by a computer. For example, as shown in FIG. 17, the first video analysis unit 100*b* is configured by a microcomputer or the like which includes a processor 1202 such as CPU (Central Processing Unit) for performing arithmetic processing or the like, a memory 1203 including ROM (Read Only Memory) and RAM (Random Access Memory) in which arithmetic programs and the like to be executed by the processor 1202 are stored, an interface unit (I/F) 1201 which receives and outputs signals from and to the outside, and the like. The processor 1202, the memory 1203, and the interface unit 1201 are interconnected to one another via a data bus or the like. The interface unit (I/F) 1201 may be used to perform wireless LAN communication defined in IEEE 802.11 series or mobile communication defined in 3GPP (3rd Generation Partnership Project). Alternatively, the interface unit (I/F) 1201 may include, for example, a network interface card (NIC) conforming to the IEEE 802.3 series.

As shown in FIG. 5, the first video analysis unit 100*b* includes a video frame reception unit 101*b*, a frame distribution unit 103b, a changing unit 104b, a first detection unit 105b, a motion vector acquisition unit 106b, an analysis result transmission unit 107b, an encoder 108b, and a storage unit 110b.

The video frame receiving unit 101b continuously receives one or more video frames from an in-vehicle mounted camera (not shown) via a wired network. In this example, the in-vehicle mounted camera will be described as an example, but other cameras such as a fixed camera may be used. Each of received video frames is temporarily stored in the storage unit 110b.

The frame distribution unit 103b distributes video frames from the video frame reception unit 101b at a predetermined frame transmission rate (may also be called distribution rate) according to which one of the first video analysis unit 100b and the second video analysis unit 200b analyzes the frames. For example, when the predetermined frame transmission rate is set to 10%, one frame out of ten video frames sequentially received is transmitted to the second video analysis unit 200b, and then nine frames are distributed to the first video analysis unit 100b. The frame distribution unit 103b distributes sequentially-received video frames at the predetermined frame transmission rate or more so that the video frames are analyzed in the second video analysis unit 200b. The predetermined frame transmission rate can be set based on the available band of a wireless network from the first video analysis unit 100b to the second video analysis unit 200b.

Further, the frame distribution unit 103b estimates an available band indicating a band that can be used for transmitting data in a wireless network. For example, the frame distribution unit 103b may evaluate the available band with a level-divided value (for example, large, medium, and small), and may stepwise change the frame transmission rate based on the evaluated available band (details will be described later).

When the encoder 108b receives, from the frame distribution unit 103b, the video frames which are distributed to be analyzed in the second video analysis unit 200b, the encoder 108b encodes the video frames with a predetermined quality, and transmits the encoded video frames to the second video analysis unit 200b.

On the other hand, the video frames which are distributed in the frame distribution unit 103b so as to be analyzed in the first video analysis unit 100b are sent to the first detection unit 105b.

Figure 6:
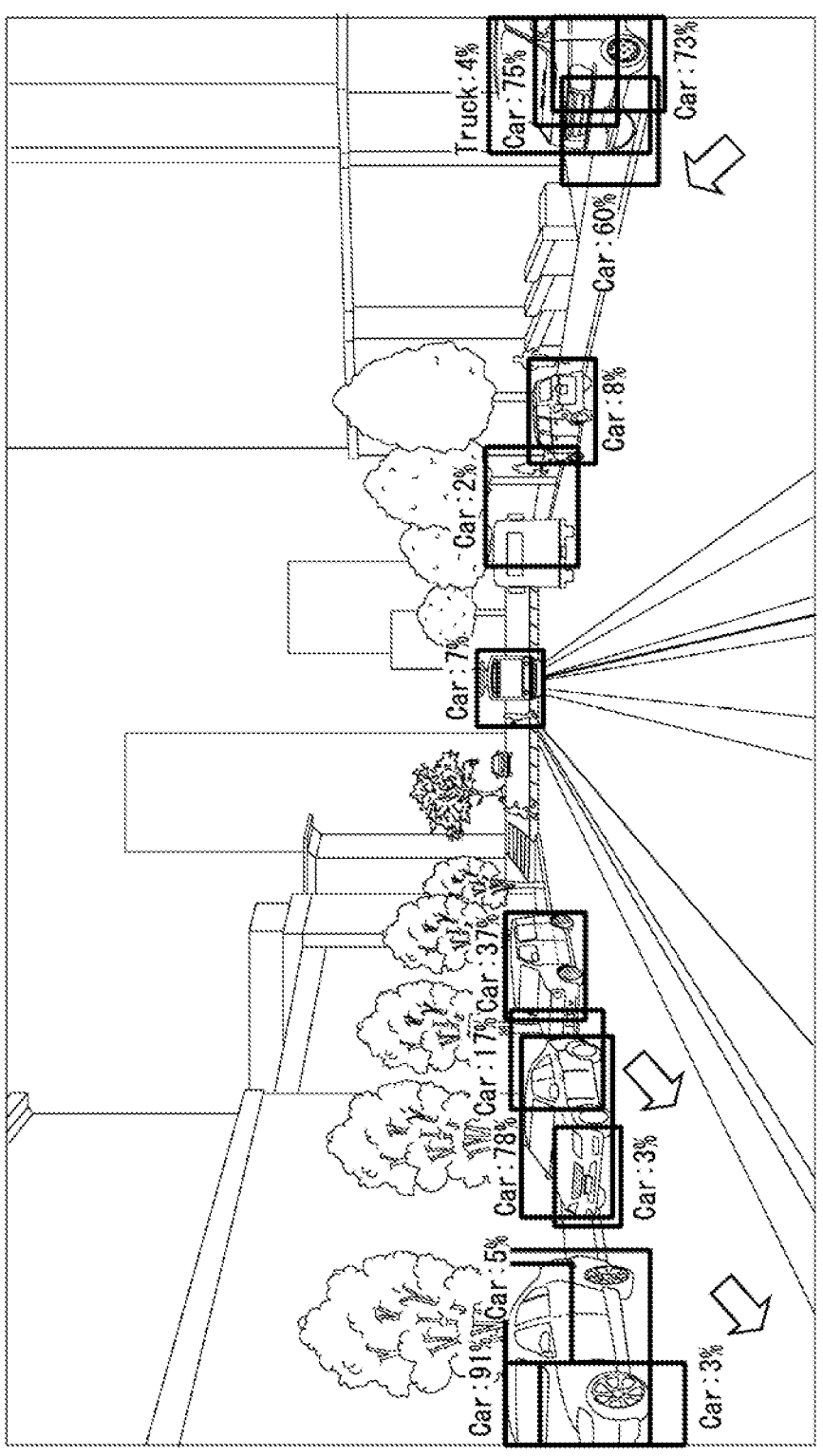
FIG. 6 is a diagram showing a video frame including illustrative target objects to be detected by a first video analysis unit according to the third example embodiment.

The first detection unit 105b detects target objects in the distributed frames. Specifically, the first detection unit 105b uses a video analysis program A (sometimes called an edge model, a lightweight model, or a low-accuracy model) to perform image analysis on the video frames distributed by the frame distribution unit 103b. FIG. 6 is a diagram showing a video frame including illustrative target objects detected by the first video analysis unit. Examples of the lightweight model include YOLOv3 Tiny which has slightly inferior recognition accuracy, but can operate at high speed. FIG. 6 shows an illustrative video frame captured by imaging a front side using an in-vehicle mounted camera of a traveling vehicle. In this example, traffic-related target objects such as cars, trucks, buses, motorcycles, bicycles, pedestrians, and traffic lights are detected. As shown in FIG. 6, each detected target object is surrounded by a bounding box. A notation "Car: 3%" shown near the bounding box indicates that the probability (reliability) that the target object is a car is equal to 3%. In the case of traffic-related target objects, about 1 to 200 target objects can be detected per frame.

Figure 7:
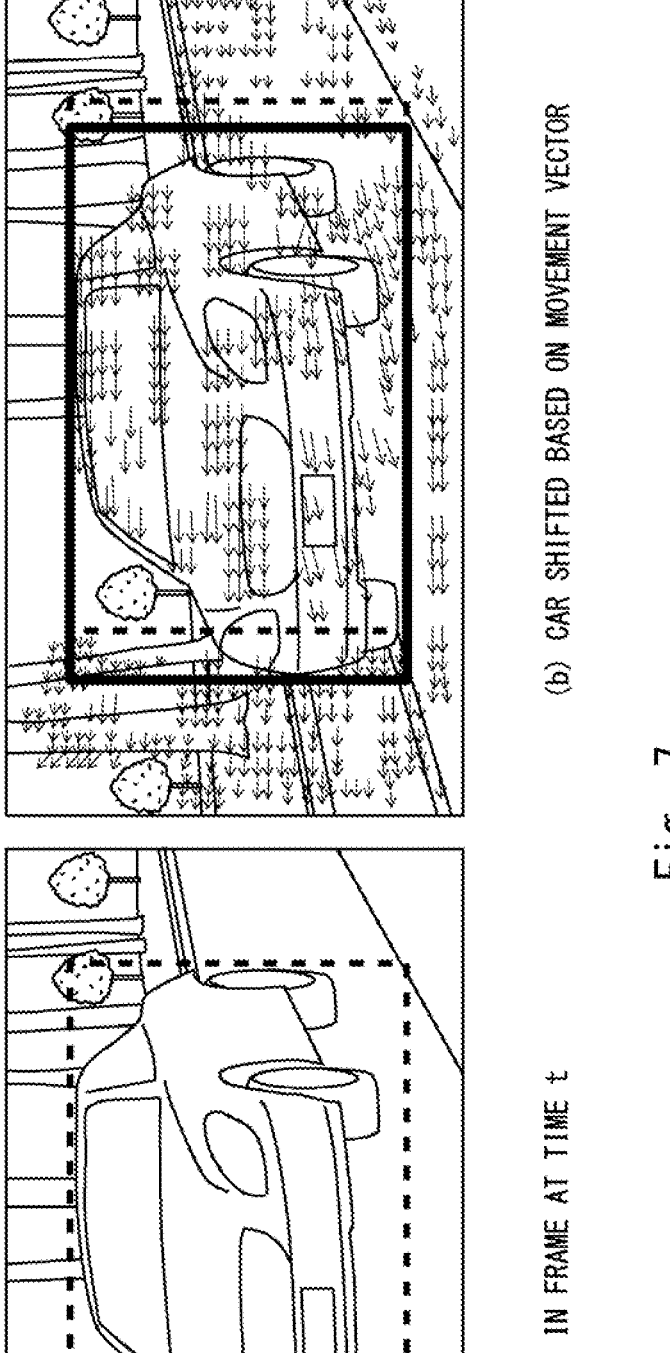
FIG. 7 is a diagram showing an example of calculating a motion vector according to the third example embodiment.

The motion vector acquisition unit 106b acquires motion vectors in target objects detected by the first detection unit 105b between two frames. In other words, the motion vector acquisition unit 106b can acquire motion vectors by comparing the luminance gradient or the like between a detection result frame from the first detection unit 105b and a frame stored in the storage unit 110b. FIG. 7 is a diagram showing an example of calculating a motion vector. FIG. 7(a) shows a detected car in a video frame captured at time t. The motion vector acquisition unit 106b acquires an average value of the motion vector within the bounding box indicated by a broken line. This motion vector can be used to calculate how degree the two frames are displaced from each other and adjust a detection position. The two frames may be two frames that are sequential in time series (for example, t−1, t) or two frames having a time lag of a predetermined time (for example, t−5, t). Here, the motion vector is acquired by acquiring Optical Flow using the Gunnar Farneback method. In other words, first, motion vectors in the x and y directions for pixels are generated in the entire frame. Thereafter, an average vector within a detection area (for example, a bounding box) of each edge target object is calculated. This makes it possible to recognize in which direction each detection target is moving between frames.

FIG. 7(b) shows a car which is shifted based on the acquired motion vector in an adjustment unit 207b (that is, FIG. 7(b) is an estimated video frame at time t+1). A bounding box indicated by a solid line indicates a bounding box after shifting. In this manner, the target object can be moved by the amount corresponding to a predetermined time based on the motion vector. In the present example embodiment, the data volume can be significantly reduced by focusing only on motion vectors associated with a detected target object or a bounding box instead of overall motion vectors of two frames.

The analysis result transmission unit 107b transmits target objects detected by the first detection unit 105 and motion vectors acquired by the motion vector acquisition unit 106 as analysis results to the second video analysis unit 200b via a wireless network. The analysis results may include, for example, the center coordinates (x, y), widths and heights of bounding boxes, identifiers of the detected target objects, the number of the detected target objects, and motion vectors (x, y). In other words, the analysis result transmission unit 107b transmits such analysis results to the second video analysis unit 200b instead of a video frame itself analyzed by the first video analysis unit 100b. As a result, the amount of data to be transmitted is reduced as compared with the case of transmitting the video frames themselves analyzed by the first video analysis unit 100b, and occurrence of problems (block noise, lack of frames, etc.) caused by insufficient band is suppressed.

Next, a configuration of the second video analysis unit 200b will be described. The second video analysis unit 200b is, for example, a cloud server that can be implemented by a computer. For example, as shown in FIG. 17, the second video analysis unit 200b is configured by a microcomputer including the processor 1202 such as CPU (Central Processing Unit) that performs arithmetic processing and the like, the memory 1203 including ROM (Read Only Memory) and RAM (Random Access Memory) in which arithmetic programs and the like to be executed by the processor 1202 are stored, the interface unit (I/F) 1201 which receives and outputs signals from and to the outside, and the like, and the like. The processor 1202, the memory 1203, and the interface unit 1201 are interconnected to one another via a data bus or the like. The interface unit (I/F) may be used to perform wireless LAN communication defined in IEEE 802.11 series or mobile communication defined in 3GPP (3rd Generation Partnership Project). Alternatively, the interface unit (I/F) 1201 may include, for example, a network interface card (NIC) conforming to the IEEE 802.3 series.

As shown in FIG. 5, the second video analysis unit 200*b* includes a decoder 201*b*, an analysis result reception unit 203*b*, a second detection unit 205*b*, an analysis result adjustment unit 207*b*, and a band estimation unit 212*b*.

The decoder 201*b* decodes video frames encoded by the encoder 108*b* and transmits the video frames to the second detection unit 205*b*. The decoder 201*b* may include a frame buffer for receiving and temporarily storing video frames from encoder 108.

Figure 8:
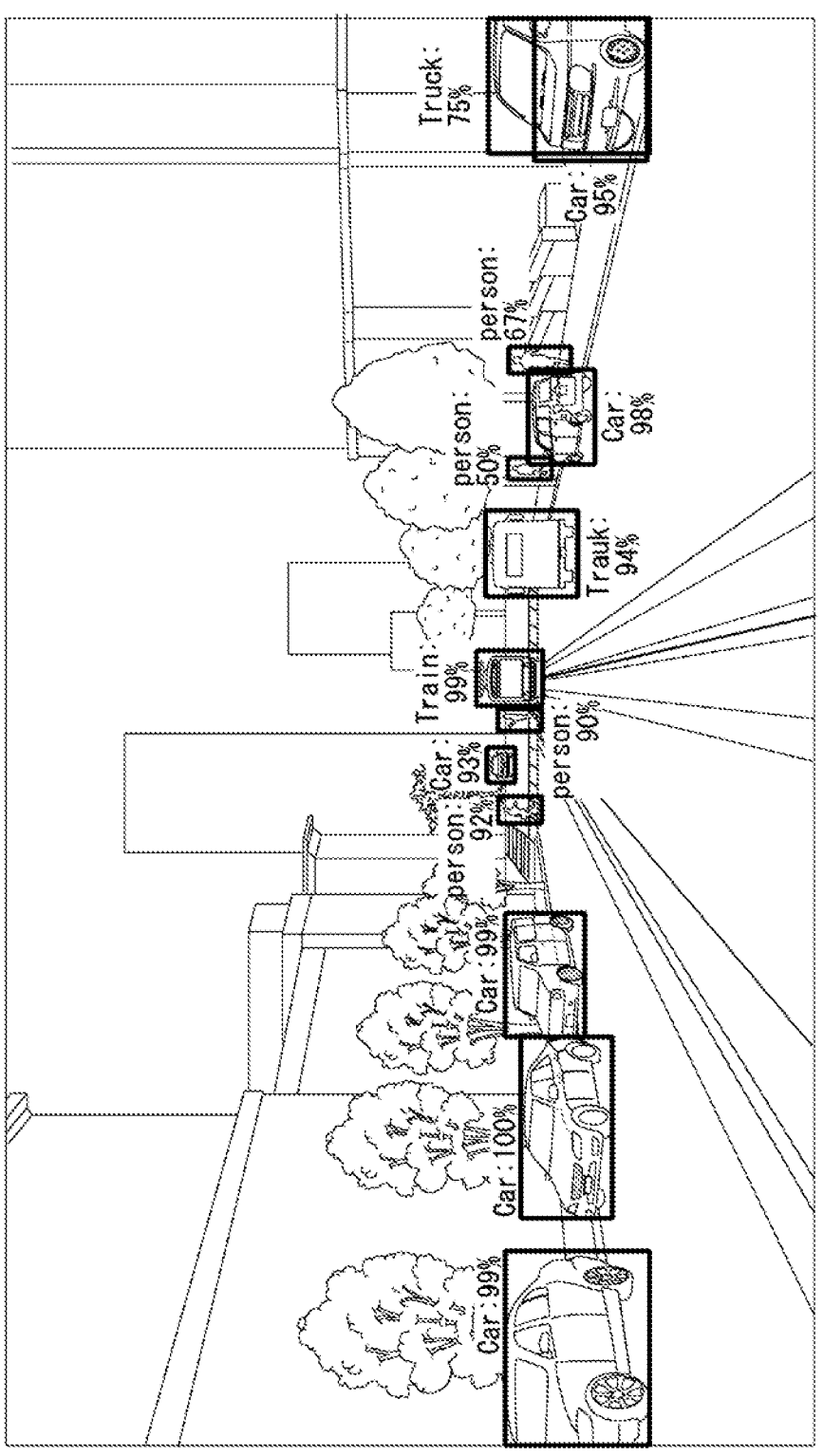
FIG. 8 is a diagram showing a frame including illustrative target objects to be detected by a second video analysis unit according to the third example embodiment.

The second detection unit 205*b* detects target objects in distributed frames. Specifically, the second detection unit 205*b* performs image analysis on video frames from the decoder 201 by using a video analysis program B (may also be called a cloud model or a high-accuracy model) capable of performing video analysis with higher accuracy than the video analysis program A). Examples of the high-accuracy model include Mask RCNN which performs general object detection and segmentation. FIG. 8 is a diagram showing a video frame including illustrative target objects to be detected by the second video analysis unit. FIG. 8 shows a result obtained when the target objects are detected by using the high-accuracy model with respect to the same video frame as in FIG. 6. In this example, as shown in FIG. 8, traffic-related target objects such as cars, bicycles, pedestrians, traffic lights and the like are detected. Each detected target object is surrounded by a bounding box. In FIG. 8, a notation "Car: 99%" shown near the bounding box indicates that the probability (reliability) that the target object is a car is 99%. FIG. 8 shows that the target object is detected with high reliability as compared with FIG. 6.

On the other hand, the analysis result reception unit 203*b* receives the analysis result from the analysis result transmission unit 107*b*. The analysis result reception unit 203*b* may be an analysis result data buffer that temporarily stores analysis result data.

The analysis result adjustment unit 207*b* adjusts a video frame based on a video frame for which the target objects have been detected by the second detecting unit 205*b* (the target objects are surrounded by bounding boxes) and motion vectors thereof. Specifically, based on the video frame for which the target objects have been detected by the second detecting unit 205*b* and the motion vectors thereof, the analysis result adjusting unit 207*b* adjusts a video frame captured after the former video frame. For example, the analysis result adjustment unit 207*b* adjusts the positions of the target objects from the detection result of the first detection unit 105*b* based on the video frame for which the target objects have been detected by the second detection unit 205*b* (the target objects are surrounded by bounding boxes) and the motion vectors thereof. In other words, the analysis result adjustment unit 207*b* refers to a detection result based on a high-accuracy model by the second detection unit 205*b* to adjust a detection result based on a low-accuracy model by the first detection unit 105*b*. The analysis result adjustment unit 207*b* refers to a video frame detected with the high-accuracy model of the second detection unit 205*b* to estimate, with high accuracy, a video frame which is captured after the former video frame and distributed to the first detection unit 105 (low-accuracy model).

A band estimation unit 212*b* refers to the usage amounts of the analysis result data buffer and the frame buffer described above to estimate an available band indicating a band which can be used to transmit data through the wireless network from the first video analysis unit 100*b* to the second video analysis unit 200*b*. The band estimation unit 212*b* notifies the estimated available band (for example, large, medium, small) to a changing unit 104 of the first video analysis unit 100*b*.

The changing unit 104*b* changes the frame transmission rate of the frame distribution unit 103*b* based on the estimated available band. For example, when the available band is large, the changing unit 104*b* may change the frame transmission rate to a higher rate, thereby increasing the analysis rate in the cloud. Alternatively, when the available band is small, the changing unit 104*b* may change the frame transmission rate to a lower rate, thereby increasing the analysis rate at the edge.

Figure 9:
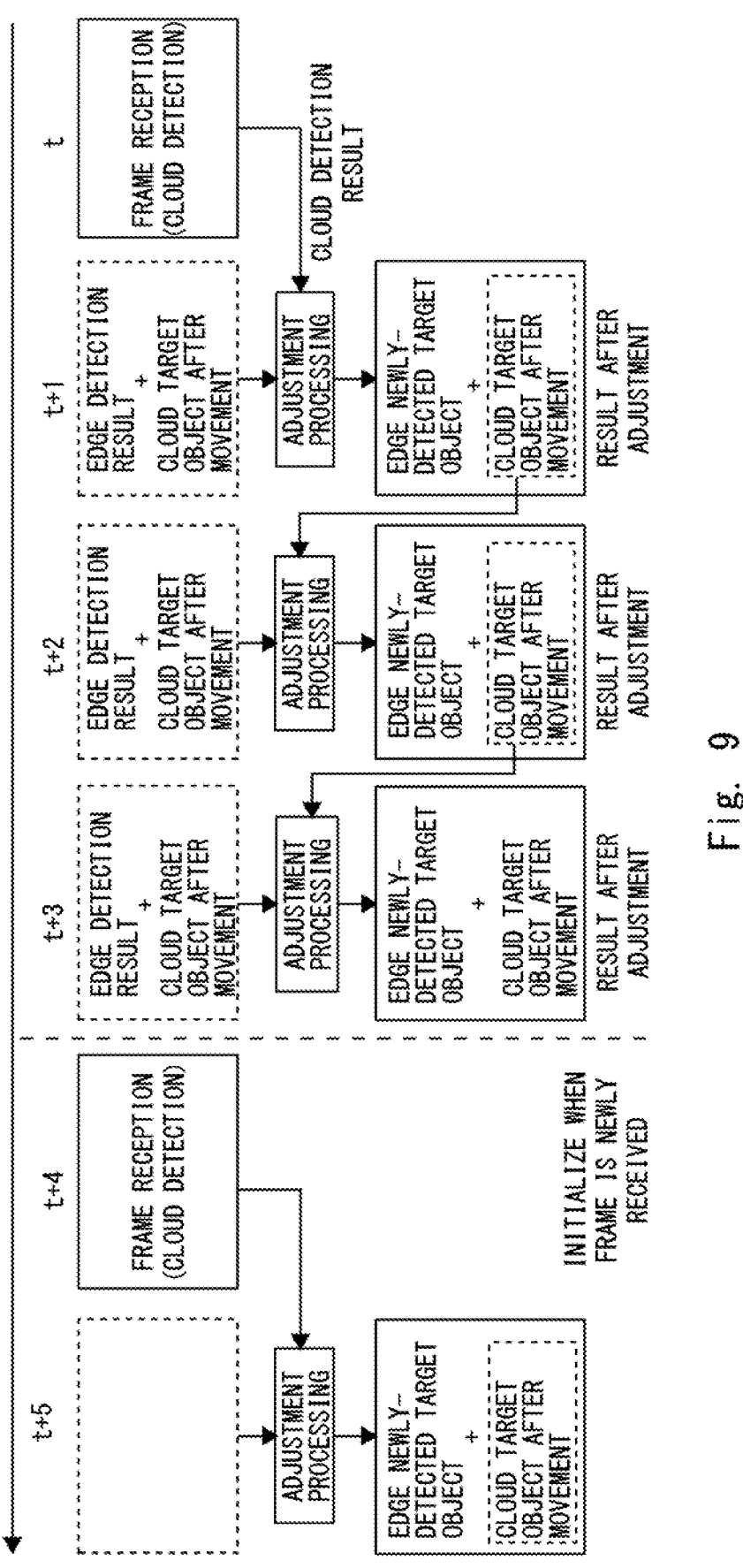
FIG. 9 is a conceptual diagram showing an overview of adjustment processing according to some example embodiments.

FIG. 9 is a conceptual diagram showing an overview of adjustment processing according to some example embodiments.

A series of video frames captured in time series are shown at an upper part of FIG. 9. Frames indicated by solid lines represent frames transmitted to the cloud. Frames indicated by broken lines represent frames distributed to an edge. In this example, the frame distribution unit 103*b* transmits frames to the second video analysis unit 200 on the cloud side at a frame transmission rate of 25%. In other words, a frame captured at time t (indicated by the solid line) is sent to the second video analysis unit 200*b* on the cloud side. Then, for the frame, detection of target objects is performed by the high-accuracy model of the second detection unit 205*b* on the cloud side. A frame for which detection of target objects has been performed on the cloud side is called a reference frame.

For frames (indicated by broken lines) captured at times t+1, t+2, and t+3 respectively, detection of target objects is performed with the light-weight model of the first detection unit 105*b* on the edge side. Since detection accuracy at the edge is poor, the following adjustment is performed.

For the frame captured at time t+1 just after the reference frame, detection of target objects is performed by the first detection unit 105 of the first video analysis unit 100*b* on the edge side. Further, for the frame captured at time t+1, motion vectors within bounding boxes surrounding the detection target objects are acquired by the motion vector acquisition unit 106*b*. These detection results (also referred to as edge detection results in this specification) and motion vectors are sent to the analysis result reception unit 203*b* of the second video analysis unit 200*b* by the analysis result transmission unit 107*b*. The analysis result adjustment unit 207*b* adjusts the edge detection result for the frame at time t+1 based on a detection result by the second detection unit 205*b* on the cloud side for the frame at time t (also called cloud detection result in this specification), and the motion vectors for the frame at time t+1.

Likewise, for the frame captured at time t+2 just after the frame captured at time t+1, detection of target objects is also performed by the first detection unit 105*b* of the first video analysis unit 100*b* on the edge side. Furthermore, for the frame captured at time t+2, the motion vector acquisition unit 106*b* acquires the motion vectors within the bounding boxes surrounding the detection target objects. These edge detection results and motion vectors are sent to the analysis result reception unit 203*b* of the second video analysis unit 200*b* by the analysis result transmission unit 107*b*. The analysis result adjustment unit 207*b* adjusts the edge detection result for the frame at time t+2 based on the adjusted result for the frame at time t+1 and the motion vectors for the frame at time t+2.

Likewise, for the frame captured at time t+3 just after the frame captured at time t+2, detection of target objects is also performed by the first detection unit 105*b* of the first video analysis unit 100*b* on the edge side. Furthermore, for the frame captured at time t+3, the motion vector acquisition unit 106*b* acquires the motion vectors within the bounding boxes surrounding the detection target objects. These edge detection results and motion vectors are sent to the analysis result reception unit 203*b* of the second video analysis unit 200*b* by the analysis result transmission unit 107*b*. The analysis result adjustment unit 207*b* adjusts the edge detection result for the frame at time t+3 based on the adjusted result for the frame at time t+2 and the motion vectors for the frame at time t+3.

The frame captured at time t+4 is sent to the second video analysis unit 200*b* on the cloud side again by the frame distribution unit 103. For this frame, detection of target objects is performed with the high-accuracy model of the second detection unit 205*b* on the cloud side. In other words, the frame captured at time t+4 becomes a reference frame, and adjustment processing at time t+5 and subsequent times thereto is performed.

In the present example embodiment, the frame transmission rate is set to 25%, but the present invention is not limited to this style. Further, the capturing interval between frames can be arbitrarily set.

Further, in the above example, for the frame at t+2 or t+3, the adjusted result of the immediately preceding frame at t+1 or t+2 is used as a standard, but the reference frame may be used as a standard. In other words, the edge detection result for the frame at time t+2 may be adjusted based on the cloud detection result for the frame at time t and the motion vectors for the frame at time t+2 which uses the reference frame at time t as a standard. Likewise, the edge detection result for the frame at time t+3 may be adjusted based on the cloud detection result for the frame at time t and the motion vectors for the frame at time t+3 which uses the reference frame at time t as a standard.

Figure 10:
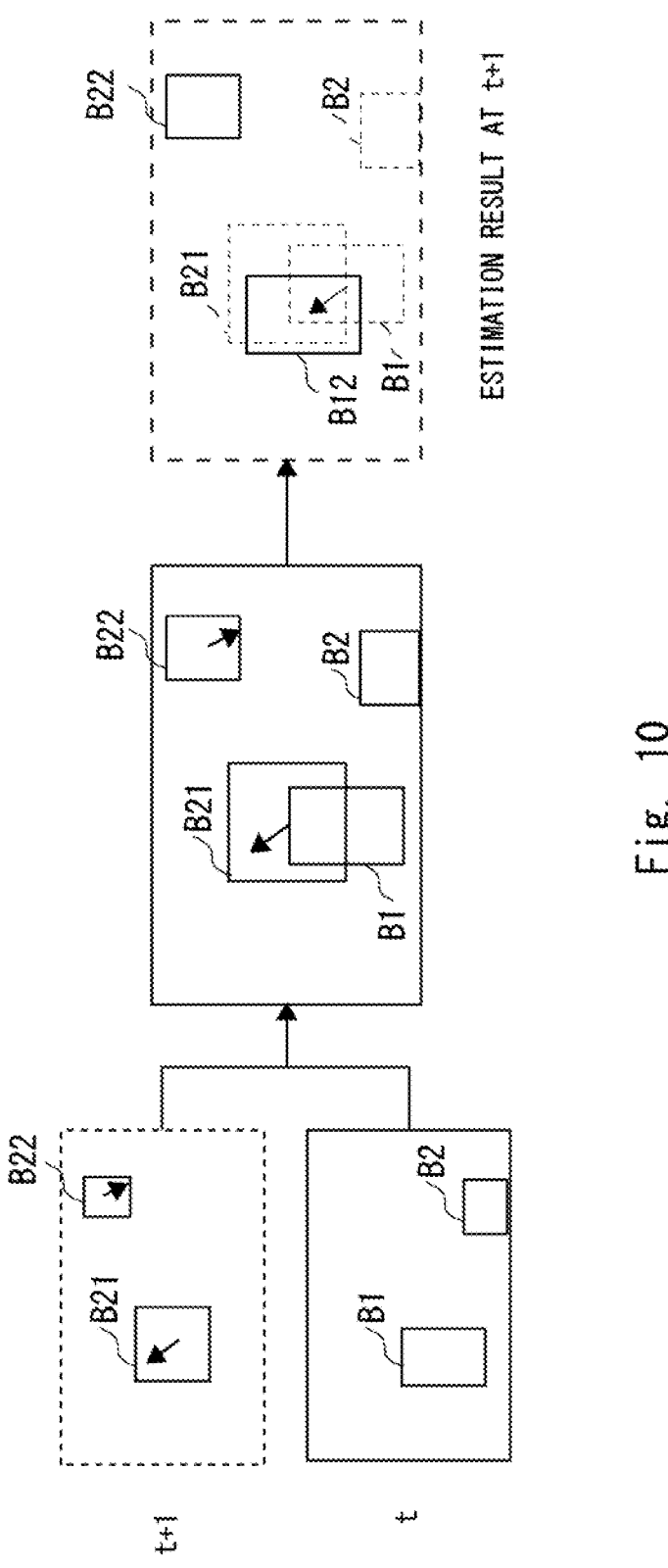
FIG. 10 is a conceptual diagram showing a specific example of adjustment processing according to some example embodiments.

FIG. 10 is a conceptual diagram showing a specific example of an operation of the analysis result adjustment unit 207*b*.

The analysis result adjustment unit 207*b* of the second video analysis unit 200*b* on the cloud side estimates an accurate result at time t+1 from the cloud detection result for the frame captured at time t and the edge detection result and motion vectors for the frame captured at time t+1.

For the frame captured at time t, detection of target objects is performed by the second detection unit 205*b* of the second video analysis unit 200*b* on the cloud side. As shown in FIG. 10, two bounding boxes B1 and B2 (also called cloud detection objects) surrounding two detected target objects are shown in the frame.

For the frame captured at time t+1 just after the frame captured at time t, detection of target objects is performed by the first detection unit 105*b* of the first video analysis unit 100 on the edge side. Two bounding boxes B21 and B22 (also called edge detection objects) surrounding two detected target objects are shown in the frame as shown in FIG. 10. As described above, the frame itself is not sent to the second video analysis unit 200*b* on the cloud side, and the detection result of the target objects (bounding boxes B21 and B22) and the average value of motion vectors in each bounding box are sent to the second video analysis unit 200*b*.

The analysis result adjustment unit 207*b* arranges the bounding boxes B21 and B22 captured at time t+1 on the reference frame captured at time t. Here, when an overlapping portion of the bounding box B1 and the bounding box B21 is equal to or more than a threshold value, the target object within the bounding box B1 and the target object within the bounding box B21 can be regarded as the same. Therefore, the bounding box B1 is shifted to the bounding box B12 by the amount corresponding to the capturing interval between these frames based on the average motion vector in the bounding box B21 (in FIG. 9, a cloud target object after shift).

For the bounding box B2 in the frame at time t, no target object is detected in the frame at time t+1 (that is, there is not any bounding box overlapping the bounding box B2 in the frame at time t+1). In other words, a target object within the bounding box B2 in the frame at time t is considered to have gotten out of the frame in the frame at time t+1 due to the movement of the target object. Therefore, the bounding box B2 is deleted from the estimation result at time t+1.

For the bounding box B22 in the frame at time t+1, no target object is detected in the frame at time t (that is, there is not any bounding box overlapping the bounding box B22 in the frame at time t). A target object within the bounding box B22 in the frame at time t+1 is considered to have newly appeared (in FIG. 9, a new edge detection object). Therefore, the bounding box B22 is retained in the estimation result at time t+1.

As described above, the analysis result adjustment unit 207*b* on the cloud side can estimate a more accurate analysis result at time t+1 (adjusted result in FIG. 9) as shown in FIG. 10 by adjusting the edge detection result at time t+1. Note that the estimated analysis result at time t+1 (adjusted result at t+1 in FIG. 9) is referred to in the adjustment processing for the frame at time t+2 (see FIG. 9).

Figure 11:
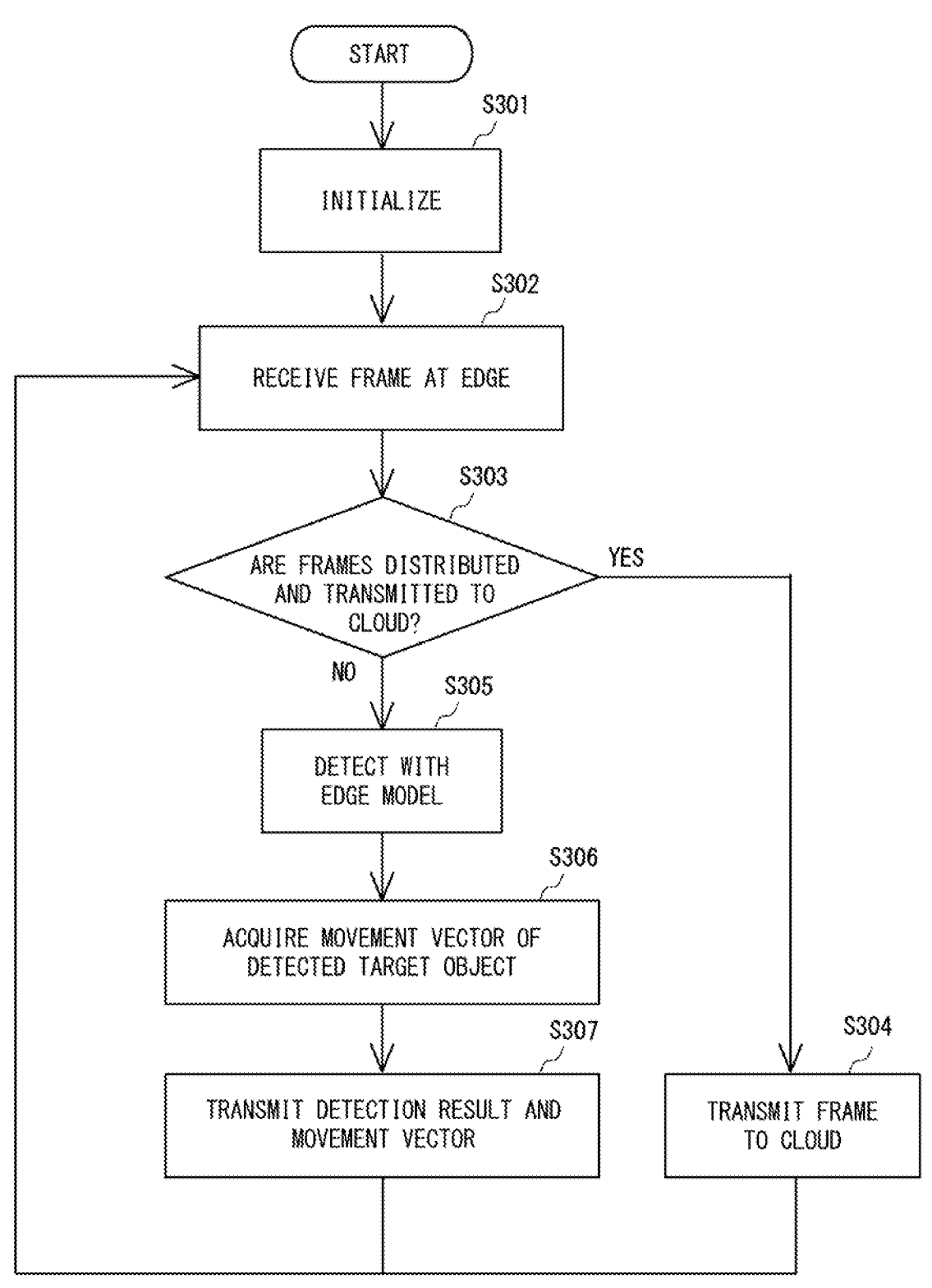
FIG. 11 is a flowchart showing an operation of a first video analysis unit arranged on an edge side according to the third example embodiment.

FIG. 11 is a flowchart showing an operation of the first video analysis unit arranged on the edge side according to the third example embodiment.

The first video analysis unit 100*b* first performs initialization (step S301). In this case, a frame distribution counter and the like are initialized. The video frame reception unit 101*b* receives a video frame from an in-vehicle mounted camera (not shown) (step S302). The frame distribution unit 103*b* distributes the video frames according to which one of the second video analysis unit 200*b* on the cloud side and the first detection unit 105*b* on the edge side analyzes the video frames (step S303). When the video frame is to be analyzed by the second video analysis unit 200*b* on the cloud side (YES in step S303), the encoder 108*b* encodes the video frame with a predetermined quality and transmits it to the second video analysis unit 200 (step S304).

On the other hand, when the video frame is to be analyzed by the first video analysis unit 100*b* on the edge side (NO in step S303), the first detection unit 105*b* uses the edge model (light-weight model) to detect target objects in the video frame (step S305). Subsequently, the motion vector acquisition unit 106 acquires average motion vectors within bounding boxes surrounding the detected target objects (step S306). The analysis result transmission unit 107*b* transmits the detection result of each target object and the motion vector of each target object to the second video analysis unit 200*b* (step S307). Subsequently, when the video frame reception unit 101*b* receives a subsequent frame in time series from the camera (returns to step S302), the above-described processing is repeated.

Next, an operation of the second video analysis unit 200*b* on the cloud side will be described.

Figure 12:
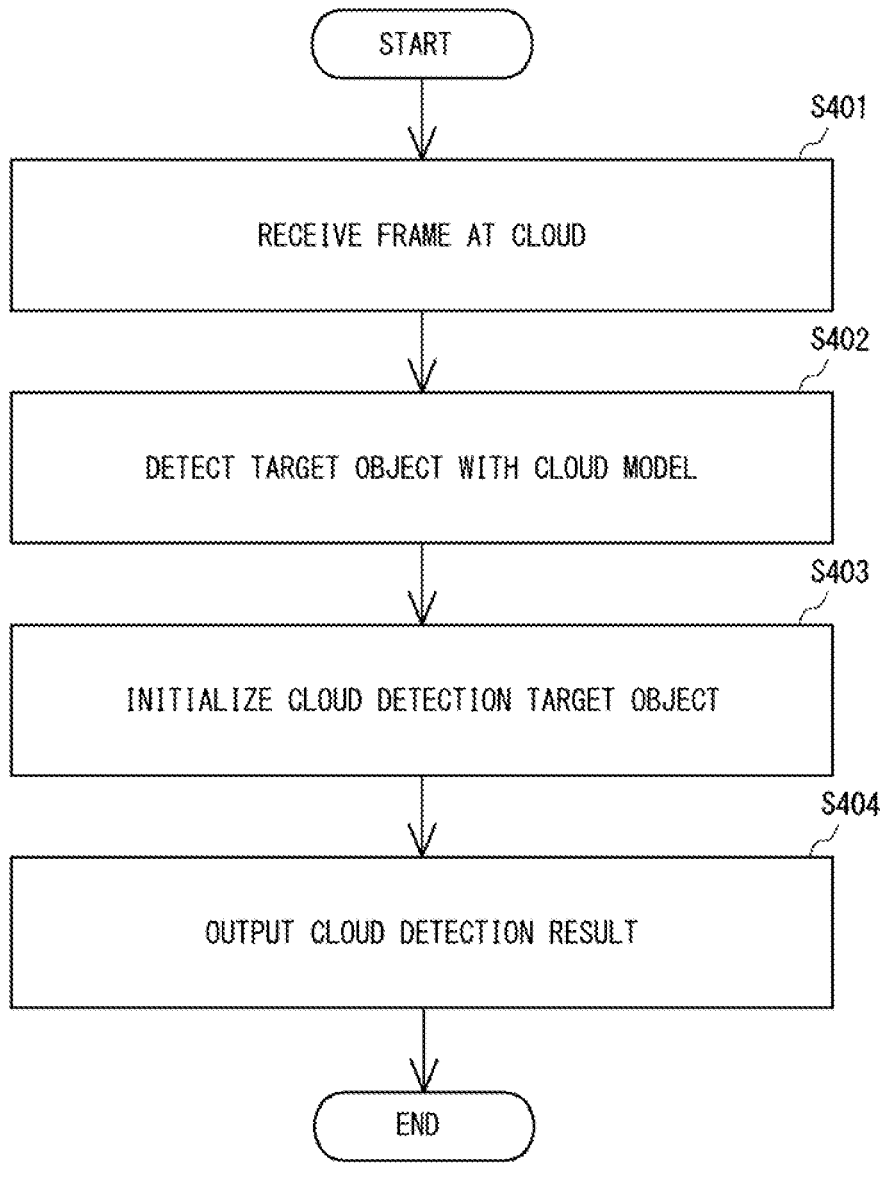
FIG. 12 is a flowchart showing an operation related to video frame reception of a second video analysis unit arranged on a cloud side according to the third example embodiment.

FIG. 12 is a flowchart showing an operation related to video frame reception of the second video analysis unit arranged on the cloud side according to the third example embodiment.

The second video analysis unit 200*b* receives a video frame (step S401). The decoder 201 decodes the encoded video frame. The second detection unit 205 uses the cloud model to detect target objects in the video frame (step S402). A cloud detection object is initialized (step S403). Here, a non-detection counter value and position of the cloud detection object described later are initialized. Finally, the second detection unit 205*b* of the second video analysis unit 200 outputs the cloud detection result to the outside and the analysis result adjustment unit 207*b* (step S404).

FIG. 13 is a flowchart showing an operation of the analysis result adjustment unit arranged on the cloud side according to the third example embodiment.

For the frame captured at time t, the analysis result adjustment unit 207*b* receives a cloud detection result from the second detection unit 205*b*, and holds it as a reference frame (step S410). The analysis result adjustment unit 207*b* receives, from the analysis result reception unit 203*b*, an edge analysis result for a frame at time t+1 captured just after the reference frame captured at time t (step S411). The analysis result includes the detection result in the first detection unit 105*b* and the motion vector of each detected target object acquired by the motion vector acquisition unit 106*b*. The volume of this analysis result data is significantly smaller than the volume of the video frame itself. When there is an unadjusted cloud detection target object in the reference frame (YES in step S412), the analysis result adjustment unit 207*b* acquires a cloud detection target object and an edge detection target object which most greatly overlap each other (step S414). In the example of FIG. 10, since the bounding box B1 surrounding the cloud detection target object and the bounding box B21 surrounding the edge detection object overlap each other most greatly, these detection targets are acquired.

Next, it is determined whether the overlap degree is equal to or more than a threshold value (step S416). Here, the overlap degree is evaluated by IoU (Intersection over Union). If the overlap degree is equal to or more than the threshold value (YES in step S416), the acquired edge detection target object is deleted (step S417), and the acquired cloud detection target object is shifted according to the motion vector of the edge detection target object (step S419). In the example of FIG. 10, since the overlap degree between the bounding box B1 and the bounding box B21 is equal to or more than the threshold value, the edge detection result may be low-accurate. Therefore, the bounding box B21 surrounding the edge detection target object is deleted. Furthermore, the bounding box B1 surrounding the cloud detection target object is shifted to the bounding box B12 according to the average motion vector within the bounding box B21. As a result, a highly accurate estimation result at t+1 is obtained.

Thereafter, the processing returns to step S412 to take other cloud detection target objects in the reference frame under consideration. In other words, when there is an unadjusted cloud detection target object in the reference frame (YES in step S412), a cloud detection target object and an edge detection target object which most greatly overlap each other are acquired (step S414). In the example of FIG. 11, only the bounding box B2 surrounding the cloud detection target object is acquired (because there is no overlapping edge detection target object).

Since there is no overlapping edge detection target object (that is, the overlap degree is zero), the overlap degree is less than the threshold value (NO in step S417), and when the cloud detection target object in the reference frame is not detected in the just-after captured frame at t+1, the non-detection counter of the cloud detection target object is added (step S421). When the non-detection counter is larger than a threshold frequency (that is, the cloud detection target object is not found in a predetermined number of sequential frames), the cloud detection target object is considered to have gotten out of the frame due to its movement, and thus is deleted. In the example of FIG. 10, the bounding box B2 surrounding the cloud detection target object is deleted.

When the adjustment processing has been performed on all cloud detection targets in the reference frame (NO in step S412), the analysis result adjustment unit 207*b* outputs the cloud detection target objects and a newly appearing edge detection target object as an estimation result at time t+1 (step S413). In the example of FIG. 10, the newly appearing edge detection target object is the bounding box B22. A specific example of the estimation result is shown in FIG. 10.

Figure 14:
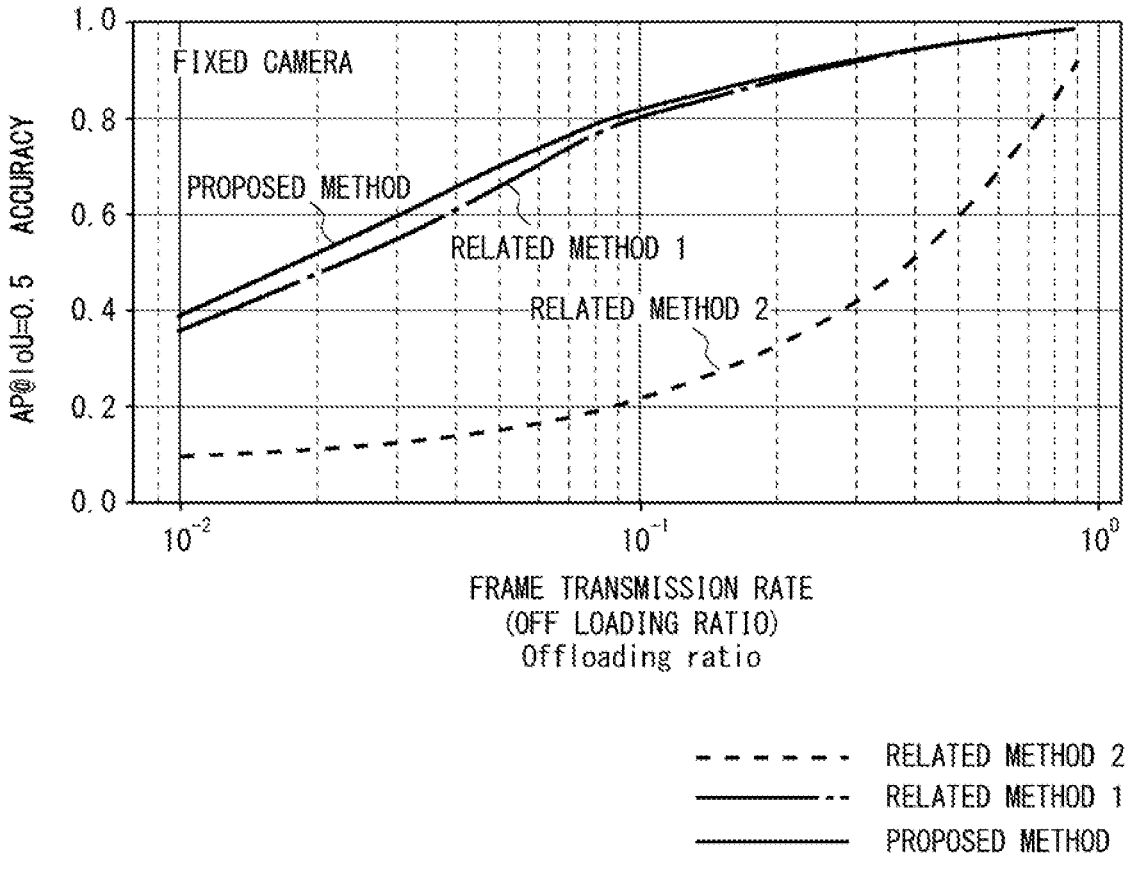
FIG. 14 is a graph showing the detection accuracy of a video analysis system using a fixed camera.

FIG. 14 is a graph showing the detection accuracy of the video analysis system using a fixed camera.

The vertical axis indicates the detection accuracy for target objects, and the horizontal axis indicates the frame transmission rate indicating the distribution rate between the edge and the cloud. For example, $10^{-1}$ on the horizontal axis means that frames are sent to the second video analysis unit 200*b* on the cloud side at a rate of one time to ten times, in other words, after frames are once sent to the second video analysis unit 200*b* on the cloud side, frames are processed sequentially nine times in the first video analysis unit 100 on the edge side.

In FIG. 14, when a fixed camera is placed near an intersection, the detection accuracy of the video analysis system according to the present example embodiment is evaluated (see a proposed method in FIG. 14). As a comparative example, a related method 1 indicates the detection accuracy when the cloud detection result for the frame captured at time t is used as the detection result for the frame captured at time t+1. As another comparative example, a related method 2 indicates the detection accuracy when the edge detection result for the frame captured at time t+1 is used as it is.

From the graph in FIG. 14, when the fixed camera is used, it can be seen that the present proposed method is slightly higher in accuracy than the related method 1, and significantly higher in accuracy than the related method 2.

Figure 15:
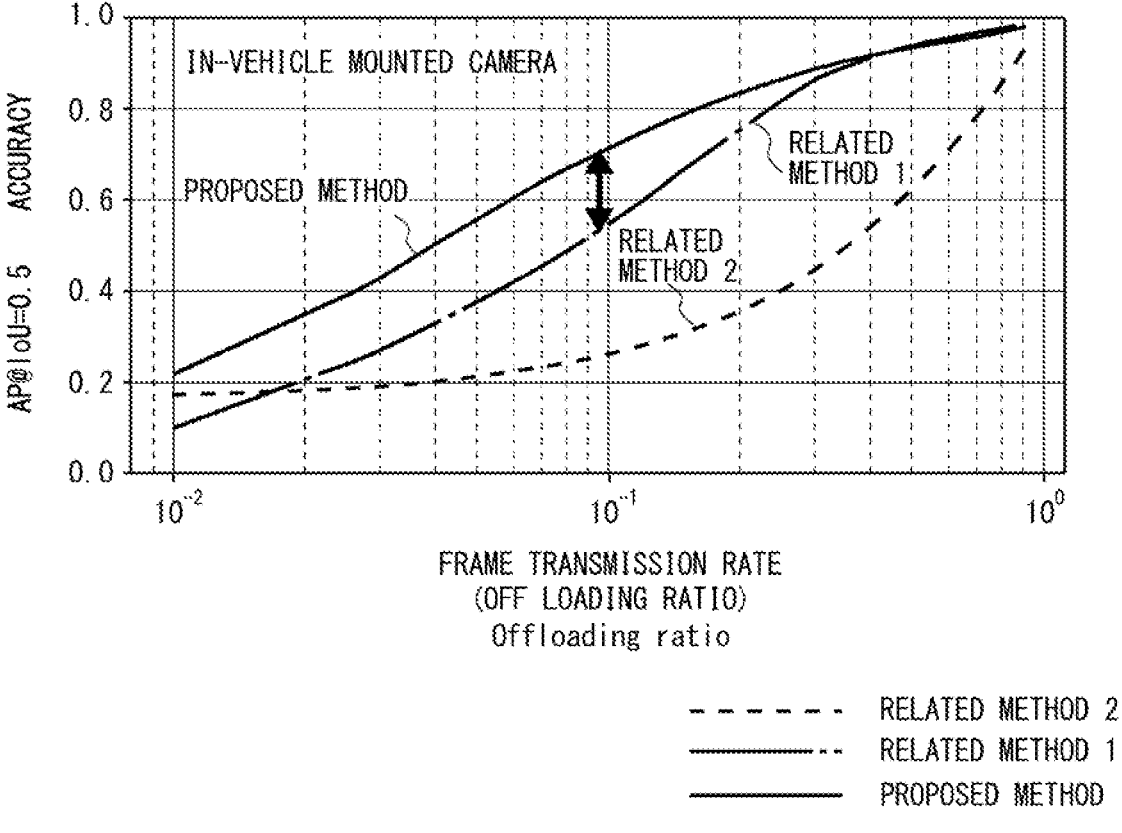
FIG. 15 is a graph showing the detection accuracy of a video analysis system using an in-vehicle mounted camera.

FIG. 15 is a graph showing the detection accuracy of the video analysis system using an in-vehicle mounted camera. Since FIG. 15 is basically the same as FIG. 14, description thereof will be omitted as appropriate.

From FIG. 15, it can be seen that the present proposed method has considerably higher accuracy than the related method 1, and has significantly higher accuracy than the related method 2 when an in-vehicle mounted camera is used. In particular, when an in-vehicle camera is used, a significant shift in detection position occurs between frames because the camera itself moves. Therefore, in the related method 2 which directly uses the cloud detection result for the immediately preceding frame, the accuracy significantly deteriorates. Further, from FIG. 15, it can be seen that the accuracy of the present proposed method also deteriorates to the same level as the related method 3 as the frame transmission rate decreases. From this point of view, the present proposed method can also implement video analysis with higher accuracy than the related methods when the frame transmission rate is equal to or more than the threshold value (for example, 1% or more in FIG. 15).

As described above, the video analysis system 1 according to the present example embodiment refers to the cloud detection result to adjust the edge detection result, whereby highly accurate video analysis can be implemented even if the wireless network uses a low band. Further, even when the difference in video detection accuracy is large between the edge model and the cloud model, highly accurate video analysis can be implemented for a series of video frames. Further, even when a camera such as an in-vehicle mounted camera moves, it is possible to implement highly accurate video analysis.

Fourth Example Embodiment

Figure 16:
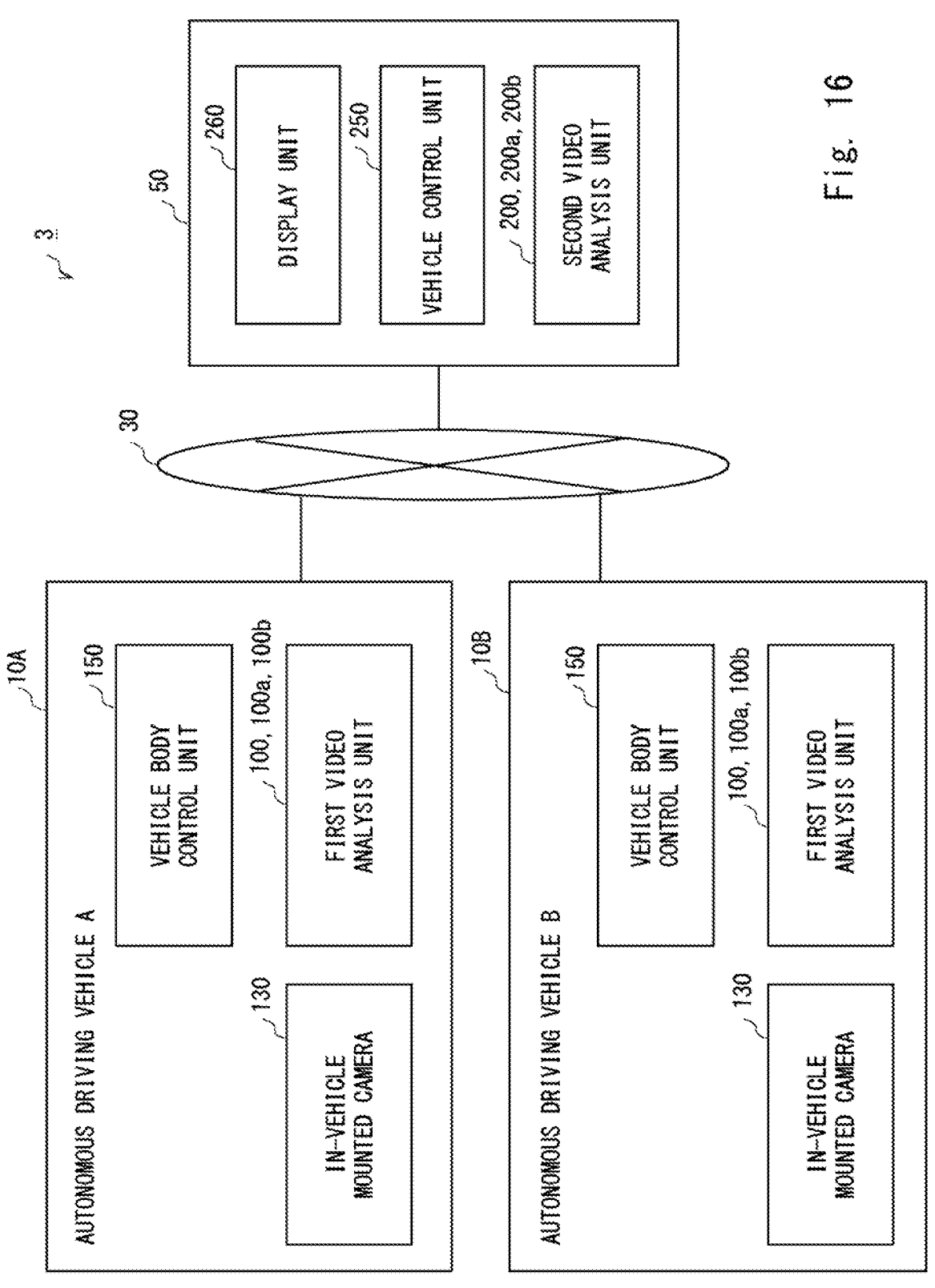
FIG. 16 is a block diagram showing a configuration of a vehicle remote control system according to a fourth example embodiment.

FIG. 16 is a block diagram showing a configuration of a vehicle remote control system according to a fourth example embodiment.

A vehicle remote control system 3 includes a plurality of autonomous driving vehicles 10A and 10B, and a remote monitoring apparatus 50 for monitoring and controlling these autonomous driving vehicles 10A and 10B. The plurality of autonomous driving vehicles 10A are connected to the remote monitoring apparatus 50 via a network 30 such as a mobile phone network. In such a mobile phone network, the video quality in the remote monitoring apparatus 50 may deteriorate due to an insufficient band because the available band may fluctuate. Two autonomous driving vehicles are shown in FIG. 16, but the number of vehicles is not limited to 2. There may be provided autonomous driving vehicles of N (a natural number equal to or more than N).

Examples of the network 30 described herein include a local area network (LAN) and a wide area network (WAN) such as the Internet. Further, communication networks can be implemented by using any known network protocol including various wired or wireless protocols such as Ethernet (registered trademark), Universal Serial Bus (USB), FIREWIRE (registered trademark), Global System for Mobile Communications (GSM (registered trademark)), Enhanced Data GSM (registered trademark) Environment (EDGE), code division multiple access (CDMA), time division multiple access (TDMA), Bluetooth (registered trademark), Wi-Fi (registered trademark), voice over Internet Protocol (VoIP), Wi-MAX (registered trademark), or any other suitable communication protocols.

Each autonomous driving vehicle includes one or more in-vehicle mounted cameras 130, a first video analysis unit 100, and a vehicle body control unit 150 as shown in FIG. 16. The specific configuration of the first video analysis unit 100 (100a, 100b) is basically the same as the configuration described above, and thus description thereof will be omitted here. The first video analysis unit 100 distributes video frames from the in-vehicle mounted camera 130 to the first video analysis unit 100 or the second video analysis unit 200 as described above. The first video analysis unit 100 encodes frames to be distributed to the second video analysis unit 200, and transmits the encoded frames to the second video analysis unit 200 via the wireless network. Further, the first video analysis unit 100 detects target objects in the frames distributed to the first video analysis unit 100 by using the edge model. Further, the first video analysis unit 100 acquires a motion vector in a detection area of a target object. The first video analysis unit 100 transmits each target object (detection result) and the motion vector associated with the target object to the remote monitoring apparatus 50 via the wireless network.

The remote monitoring apparatus 50 remotely monitors and controls each autonomous driving vehicle by using video images received from an in-vehicle mounted camera of each autonomous driving vehicle. For example, a remote driver may remotely drive a specific autonomous driving vehicle while watching a display unit 260 on which video images from each in-vehicle mounted camera are displayed. Alternatively, the remote monitoring apparatus 50 may automatically control each autonomous driving vehicle based on highly-accurate video analysis results.

The remote monitoring apparatus 50 includes the display unit 260, a second video analysis unit 200 (200a, 200b), and a vehicle control unit 250. Since the detailed configuration of the second video analysis unit 200 (200a, 200b) is basically the same as the configuration described above, description thereof is omitted here. The second video analysis unit 200 detects target objects in video frames sent from each autonomous driving vehicle by using the cloud model. Further, as described above, the second video analysis unit 200 adjusts an analysis result sent from the first video analysis unit 100 of each autonomous driving vehicle. As a result, the second video analysis unit 200 can obtain not only highly-accurate detection results for video frames sent from each autonomous driving vehicle, but also highly-accurate estimation results for subsequent video frames.

The display unit 260 displays analysis results analyzed by the second video analysis unit 200. For example, as shown in FIG. 8, a plurality of detection target objects which are surrounded by bounding boxes respectively may be displayed.

The vehicle control unit 250 can estimate the movement of each autonomous driving vehicle based on the video analysis result of the second video analysis unit 200, and determine and transmit control information on appropriate autonomous driving for each vehicle. For example, when the vehicle control unit 250 determines from the analysis result of the second video analysis unit 200 that an oncoming vehicle (for example, an autonomous driving vehicle 10B) is approaching in the vicinity of a crossroad, the vehicle control unit 250 instructs a vehicle body control unit 150 of an own vehicle (for example, an autonomous driving vehicle 10A) which is not a priority vehicle to stop the own vehicle before entering the crossroad.

Further, the vehicle control unit 250 can identify a vehicle (for example, the vehicle 10B) taking an abnormal driving or a unique driving from each analysis result of the second video analysis unit 200 for the autonomous driving vehicle 10A and the autonomous driving vehicle 10B. Thereafter, the vehicle control unit 250 may instruct to change the frame transmission rate (for example, 50%) for defining the rate of frames to be transmitted to the second video analysis unit 200 in the frame distribution unit 103 inside the first video analysis unit 100 of the specified vehicle (for example, the vehicle 10B). As a result, it is possible to analyze, with a higher accuracy, the video frames from the in-vehicle mounted camera of the vehicle that is taking an abnormal or unique driving, and implement highly safe remote control.

According to the present example embodiment, it is possible to provide a vehicle remote control system with higher safety by implementing highly-accurate video analysis even if there is band fluctuation or band shortage.

FIG. 17 is a block diagram showing configuration examples of video analysis units 100 and 200 (hereinafter referred to as video analysis units 100 and the like). Referring to FIG. 17, the video analysis unit 100 and the like include the network interface 1201, the processor 1202 and the memory 1203. The network interface 1201 is used to communicate with other network node apparatuses constituting the communication system. The network interface 1201 may be used to conduct wireless communications. For example, the network interface 1201 may be used to perform wireless LAN communication defined in IEEE 802.11 series or mobile communication defined in 3GPP (3rd Generation Partnership Project). Alternatively, the network interface 1201 may include, for example, a network interface card (NIC) conforming to IEEE 802.3 series.

The processor 1202 reads out software (computer program) from the memory 1203 and executes it to perform the processing of the monitoring apparatus 10 and the like described using the flowcharts or sequences in the above example embodiments. The processor 1202 may be, for example, a microprocessor, an MPU (Micro Processing Unit), or a CPU (Central Processing Unit). The processor 1202 may include a plurality of processors.

The memory 1203 is configured by a combination of a volatile memory and a non-volatile memory. The memory 1203 may include a storage remotely located from the processor 1202. In this case, the processor 1202 may access the memory 1203 via an I/O interface (not shown).

In the example of FIG. 17, the memory 1203 is used to store a software module group. The processor 1202 reads out and executes the software module group from the memory 1203, whereby it is possible to perform the processing of the video analysis unit 100 and the like described in the above example embodiments.

As described with reference to FIG. 17, each of the processors included in the video analysis unit 100 and the like executes one or a plurality of programs containing an instruction group for causing a computer to execute the algorithms described with reference to the drawings.

The flowcharts of FIGS. 2, 4, 11, 12, and 13 show a specific order of execution, but the order of execution may differ from the illustrated form. For example, the order of execution of two or more steps may be interchanged with respect to the order shown. Further, two or more steps shown sequentially in FIGS. 2, 4, 11, 12 and 13 may be performed concurrently or partially concurrently. Further, in some example embodiments, one or a plurality of steps shown in FIGS. 2, 4, 11, 12 and 13 may be skipped or omitted.

In the above examples, the programs can be stored and delivered to computers by using various types of non-transitory computer readable media. The non-transitory computer-readable media include various types of tangible storage media. Examples of the non-transitory computer-readable media include magnetic recording media (for example, flexible discs, magnetic tapes, hard disk drives), magneto-optical recording media (for example, magneto-optical discs), CD-ROM (Read Only Memory), CD-R, CD-R/W, DVD (Digital Versatile Disc), BD (Blu-ray (registered trademark) Disc), semiconductor memories (for example, mask ROM, PROM (Programmable ROM), EPROM (Erasable PROM), flash ROM, RAM (Random Access Memory)). The programs may also be delivered to the computers by various types of transitory computer readable media. Examples of transitory computer-readable media include electrical signals, optical signals, and electromagnetic waves. The transitory computer-readable media can deliver the programs to the computers via wired communication channels such as electrical wires and optical fibers, or wireless communication channels.

Note that the present invention is not limited to the above example embodiments, and can be modified as appropriate without departing from the scope of the invention. For example, the first video analysis unit 100 and the second video analysis unit 200 in the video analysis apparatus 1 may be provided within the same apparatus, within the same server, or within the same site. Further, the plurality of examples or example embodiments described above can be implemented in combination as appropriate.

Some or all of the above example embodiments can also be described as the following supplementary notes, but are not limited to the following description.

(Supplementary Note 1)

A video analysis apparatus comprising a first video analysis unit and a second video analysis unit in which the first video analysis unit comprises:

a distribution unit for distributing at least two frames to the first video analysis unit or the second video analysis unit;

a first detection unit for detecting a target object in the frames distributed to the first video analysis unit; and an acquisition unit for acquiring information on movement associated with the detected target object, and transmitting the information on the movement and a detection result in the first detection unit to the second video analysis unit, and the second video analysis unit comprises:

a second detection unit for detecting a target object in the frames received from the distribution unit; and an adjustment unit for adjusting the detection result in the first detection unit based on a detection result in the second detection unit and the information on the movement.

(Supplementary Note 2)

The video analysis apparatus described in the supplementary note 1 in which the first video analysis unit comprises:

a movement information acquisition unit for acquiring information on movement of the detected target object within a detection area;

an analysis result transmission unit for transmitting the information on the movement and a detection result in the first detection unit as an analysis result to the second video analysis unit; and a frame transmission unit for transmitting frames which have been distributed to be analyzed in the second video analysis unit to the second video analysis unit.

(Supplementary Note 3)

The video analysis apparatus described in the supplementary note 1 or 2 in which the distribution unit distributes a series of sequentially received frames at a predetermined frame transmission rate or more so as to analyze the frames in the second video analysis unit.

(Supplementary Note 4)

The video analysis apparatus described in the supplementary note 3 further comprising:

an estimation unit for estimating a band available for a network from the first video analysis unit to the second video analysis unit; and a changing unit for changing the predetermined frame transmission rate according to the estimated available band.

(Supplementary Note 5)

The video analysis apparatus described in the supplementary note 2 in which the analysis result includes a center coordinate of a box surrounding a detected target object, width and height of the box, and an identifier indicating the detected target object.

(Supplementary Note 6)

The video analysis apparatus described in any one of the supplementary notes 1 to 5 in which frames distributed to the first video analysis unit are captured after frames distributed to the second video analysis unit.

(Supplementary Note 7)

The video analysis apparatus described in any one of the supplementary notes 1 to 6 in which the information on the movement includes information on a moving direction of the target object or a movement vector.

(Supplementary Note 8)

A video analysis system comprising a first video analysis unit and a second video analysis unit in which the first video analysis unit comprises:

a distribution unit for distributing at least two frames to the first video analysis unit or the second video analysis unit;

a first detection unit for detecting a target object in the frames distributed to the first video analysis unit; and an acquisition unit for acquiring information on movement associated with the detected target object, and transmitting the information on the movement and a detection result in the first detection unit to the second video analysis unit, and the second video analysis unit comprises:

a second detection unit for detecting a target object in the frames received from the distribution unit; and an adjustment unit for adjusting the detection result in the first detection unit based on a detection result in the second detection unit and the information on the movement.

(Supplementary Note 9)

The video analysis system described in the supplementary note 8 in which the first video analysis unit comprises:

a movement information acquisition unit for acquiring information on movement of the detected target object within a detection area;

an analysis result transmission unit for transmitting the information on the movement and a detection result in the first detection unit as an analysis result to the second video analysis unit; and a frame transmission unit for transmitting frames which have been distributed to be analyzed in the second video analysis unit to the second video analysis unit.

(Supplementary Note 10)

The video analysis system described in the supplementary note 8 in which the distribution unit distributes a series of sequentially received frames at a predetermined frame transmission rate or more so as to analyze the frames in the second video analysis unit.

(Supplementary Note 11)

The video analysis system described in the supplementary note 10, further comprising:

an estimation unit for estimating a band available for a network from the first video analysis unit to the second video analysis unit; and a changing unit for changing the predetermined frame transmission rate according to the estimated available band.

(Supplementary Note 12)

The video analysis system described in any one of the supplementary notes 8 to 11 in which frames distributed to the first video analysis unit are captured after frames distributed to the second video analysis unit.

(Supplementary Note 13)

The video analysis system described in any one of the supplementary notes 8 to 12 in which the first video analysis unit is provided on an edge side, and the second video analysis unit is provided on a cloud side.

(Supplementary Note 14)

A video analysis method in which a series of frames are subjected to video analysis while distributed into a first video analysis unit and a second video analysis unit, comprising:

in the first video analysis unit, distributing at least two received frames to the first video analysis unit or the second video analysis unit;

detecting a target object in a frame which has been distributed to be analyzed in the first video analysis unit; and acquiring information on movement associated with the detected target object, and transmitting the information on the movement and a detection result in the first video analysis unit to the second video analysis unit, and in the second video analysis unit, detecting a target object in a frame received from the first video analysis unit; and adjusting a detection result in the first video analysis unit based on a detection result in the second video analysis unit and the information on the movement.

(Supplementary Note 15)

The video analysis method described in the supplementary note 14 in which in the first video analysis unit, a series of sequentially received frames are distributed at a predetermined frame transmission rate or more so as to analyze the frames in the second video analysis unit.

(Supplementary Note 16)

The video analysis method described in the supplementary note 14 or 15 further comprising:

in the second video analysis unit, estimating a band available for a network from the first video analysis unit to the second video analysis unit; and in the first video analysis unit, changing a frame transmission rate according to the estimated available band.

(Supplementary Note 17)

The video analysis method described in the supplementary note 14 further comprising: transmitting an analysis result including a center coordinate of a box surrounding a detected target object, width and height of the box, and an identifier indicating the detected target object to the second video analysis unit.

(Supplementary Note 18)

The video analysis method described in any one of the supplementary notes 14 to 17 in which the first video analysis unit is provided on an edge side, and the second video analysis unit is provided on a cloud side.

(Supplementary Note 19)

The video analysis method described in any one of the supplementary notes 14 to 18 in which frames distributed to the first video analysis unit are captured after frames distributed to the second video analysis unit.

(Supplementary Note 20)

The video analysis method described in any one of the supplementary notes 14 to 19 in which the information on the movement includes information on a moving direction of the target object or a movement vector.

Although the present invention has been described with reference to the example embodiments, the present invention is not limited to the above example embodiments. Various alterations that can be understood by those skilled in the art can be made to the configurations and details of the present invention within the scope of the present invention.

This application claims priority based on Japanese Patent Application No. 2020-071448 filed on Apr. 13, 2020, and the entire disclosure thereof is incorporated herein.

REFERENCE SIGNS LIST

1 VIDEO ANALYSIS SYSTEM
3 VEHICLE REMOTE CONTROL SYSTEM
10 AUTONOMOUS DRIVING VEHICLE
30 NETWORK
50 REMOTE MONITORING APPARATUS
100 FIRST VIDEO ANALYSIS UNIT
101b VIDEO FRAME RECEPTION UNIT
103 DISTRIBUTION UNIT
103b FRAME DISTRIBUTION UNIT
104b CHANGING UNIT
105 FIRST DETECTION UNIT
105a, 105b FIRST DETECTION UNIT
106 ACQUISITION UNIT
106a MOVEMENT INFORMATION ACQUISITION UNIT
106b MOVEMENT VECTOR ACQUISITION UNIT
107a ANALYSIS RESULT TRANSMISSION UNIT
108b ENCODER
109a FRAME TRANSMISSION UNIT
110b STORAGE UNIT (BUFFER)
150 VEHICLE BODY CONTROL UNIT
200 SECOND VIDEO ANALYSIS UNIT
201b DECODER
203b ANALYSIS RESULT RECEPTION UNIT
205 SECOND DETECTION UNIT
207, 207a ADJUSTMENT UNIT
207b ANALYSIS RESULT ADJUSTMENT UNIT
212b BAND ESTIMATION UNIT
250 VEHICLE CONTROL UNIT
260 DISPLAY UNIT

What is claimed is:

1. A video analysis apparatus comprising:
a first video analysis unit arranged on an edge side, and
a second video analysis unit arranged on a cloud side and connected to the first video analysis unit via a wireless network,
wherein the first video analysis unit comprises:
at least one memory storing instructions, and
at least one processor configured to execute the instructions to:
divide a series of sequentially received frames to be distributed among the first video analysis unit and the second video analysis unit;
detect a target object in the frames distributed to the first video analysis unit; and
acquire information on a movement associated with the detected target object, and transmit the information on the movement and a detection result in the first video analysis unit to the second video analysis unit, and
the second video analysis unit comprises:
at least one memory storing instructions, and
at least one processor configured to execute the instructions to:
detect a target object in the frames received from the first video analysis unit; and
adjust the detection result in the first video analysis unit based on a detection result in the second video analysis unit and the information on the movement.

2. The video analysis apparatus according to claim 1, wherein the at least one processor of the first video analysis unit is further configured to:
acquire information on a movement of the detected target object within a detection area;
transmit the information on the movement and the detection result in the first video analysis unit as an analysis result to the second video analysis unit; and
transmit frames which have been distributed to be analyzed in the second video analysis unit to the second video analysis unit.

3. The video analysis apparatus according to claim 2, wherein the analysis result includes a center coordinate of a box surrounding a detected target object, width and height of the box, and an identifier indicating the detected target object.

4. The video analysis apparatus according to claim 1, wherein the at least one processor of the first video analysis unit is further configured to distribute a series of sequentially received frames at a predetermined frame transmission rate or more so as to analyze the frames in the second video analysis unit.

5. The video analysis apparatus according to claim 4, wherein the at least one processor of the second video analysis unit is further configured to execute the instructions to estimate a band available for a network from the first video analysis unit to the second video analysis unit, and
wherein the at least one processor of the first video analysis unit is further configured to change the predetermined frame transmission rate according to the estimated available band.

6. The video analysis apparatus according to claim 1, wherein frames distributed to the first video analysis unit are captured after frames distributed to the second video analysis unit.

7. The video analysis apparatus according to claim 1, wherein the information on the movement includes information on a moving direction of the target object or a movement vector.

8. The video analysis apparatus according to claim 1, wherein among the sequentially received frames, first frames are distributed to the first video analysis unit and second frames are distributed to the second video analysis unit, the first frames being different from the second frames.

9. A video analysis system comprising:
a first video analysis unit arranged on an edge side, and
a second video analysis unit arranged on a cloud side and connected to the first video analysis unit via a wireless network,
wherein the first video analysis unit comprises:
at least one memory storing instructions, and
at least one processor configured to execute the instructions to:
divide a series of sequentially received frames to be distributed among the first video analysis unit and the second video analysis unit;
detect a target object in the frames distributed to the first video analysis unit; and
acquire information on a movement associated with the detected target object, and transmit the information on the movement and a detection result in the first video analysis unit to the second video analysis unit, and
the second video analysis unit comprises:
at least one memory storing instructions, and
at least one processor configured to execute the instructions to:

detect a target object in the frames received from the first video analysis unit; and adjust the detection result in the first video analysis unit based on a detection result in the second video analysis unit and the information on the movement.

10. The video analysis system according to claim 9, wherein the at least one processor of the first video analysis unit is further configured to:

acquire information on a movement of the detected target object within a detection area;

transmit the information on the movement and a detection result in the first video analysis unit as an analysis result to the second video analysis unit; and transmit frames which have been distributed to be analyzed in the second video analysis unit to the second video analysis unit.

11. The video analysis system according to claim 9, wherein the at least one processor of the first video analysis unit is further configured to distribute a series of sequentially received frames at a predetermined frame transmission rate or more so as to analyze the frames in the second video analysis unit.

12. The video analysis system according to claim 11, wherein:

the at least one processor of the second video analysis unit is further configured to estimate a band available for a network from the first video analysis unit to the second video analysis unit, and the at least one processor of the first video analysis unit is further configured to change the predetermined frame transmission rate according to the estimated available band.

13. The video analysis system according to claim 9, wherein frames distributed to the first video analysis unit are captured after frames distributed to the second video analysis unit.

14. A video analysis method in which a series of frames are subjected to video analysis while distributed into a first video analysis unit arranged on an edge side and a second video analysis unit arranged on a cloud side and connected to the first video analysis unit via a wireless network, comprising:

in the first video analysis unit, dividing a series of sequentially received frames to be distributed among the first video analysis unit and the second video analysis unit;

detecting a target object in a frame which has been distributed to be analyzed in the first video analysis unit; and acquiring information on a movement associated with the detected target object, and transmitting the information on the movement and a detection result in the first video analysis unit to the second video analysis unit, and in the second video analysis unit, detecting a target object in a frame received from the first video analysis unit; and adjusting a detection result in the first video analysis unit based on a detection result in the second video analysis unit and the information on the movement.

15. The video analysis method according to claim 14, wherein in the first video analysis unit, a series of sequentially received frames are distributed at a predetermined frame transmission rate or more so as to analyze the frames in the second video analysis unit.

16. The video analysis method according to claim 14, further comprising:

in the second video analysis unit, estimating a band available for a network from the first video analysis unit to the second video analysis unit; and in the first video analysis unit, changing a frame transmission rate according to the estimated available band.

17. The video analysis method according to claim 14, further comprising: transmitting an analysis result including a center coordinate of a box surrounding a detected target object, width and height of the box, and an identifier indicating the detected target object to the second video analysis unit.

18. The video analysis method according to claim 14, wherein frames distributed to the first video analysis unit are captured after frames distributed to the second video analysis unit.

19. The video analysis method according to claim 14, wherein the information on the movement includes information on a moving direction of the target object or a movement vector.

20. The video analysis method according to claim 14, wherein, among the sequentially received frames, first frames are distributed to the first video analysis unit and second frames are distributed to the second video analysis unit, the first frames being different from the second frames.

* * * * *